United States Patent
Okamoto et al.

(10) Patent No.: US 7,336,582 B2
(45) Date of Patent: *Feb. 26, 2008

(54) OPTICAL DISK, OPTICAL DISK RECORDING METHOD AND OPTICAL DISK APPARATUS

(75) Inventors: Yutaka Okamoto, Chofu (JP); Hideo Ando, Hino (JP); Chosaku Noda, Kawasaki (JP); Yutaka Kashihara, Fuchu (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/562,613

(22) Filed: Nov. 22, 2006

(65) Prior Publication Data
US 2007/0086302 A1    Apr. 19, 2007

Related U.S. Application Data

(60) Continuation of application No. 11/328,132, filed on Jan. 10, 2006, which is a division of application No. 11/059,386, filed on Feb. 17, 2005, now Pat. No. 7,012,873, which is a division of application No. 10/748,142, filed on Dec. 31, 2003, now Pat. No. 6,870,804, which is a division of application No. 10/441,119, filed on May 20, 2003, now Pat. No. 6,711,111, which is a division of application No. 09/861,715, filed on May 22, 2001, now Pat. No. 6,587,417.

(30) Foreign Application Priority Data
May 23, 2000    (JP)    ............................. 2000-151421

(51) Int. Cl.
*G11B 5/09* (2006.01)
*G11B 7/24* (2006.01)

(52) U.S. Cl. ............... 369/59.22; 369/59.1; 369/275.4; 369/275.1

(58) Field of Classification Search ............ None
See application file for complete search history.

(56) References Cited

U.S. PATENT DOCUMENTS 5,790,492 A    8/1998    Umezawa et al.
6,044,051 A    3/2000    Miyagawa et al.

(Continued)

FOREIGN PATENT DOCUMENTS

DE    37 27 681 A1    3/1988

(Continued)

*Primary Examiner*—Muhammad Edun
(74) *Attorney, Agent, or Firm*—Oblon, Spivak, McClelland, Maier & Neustadt, P.C.

(57) ABSTRACT

A signal can be detected based on a level slice system and detection delay time can be reduced by setting the recording density of a header field in a linear direction lower (coarse) than that of a user data recording field. Further, a signal can be detected based on the level slice system and detection delay time can be reduced by using a mark position form having a large detection margin as an information recording system of the header field. A readout error of a sector number due to a detection error is compensated for by recording address marks AM for attaining byte synchronization of the header field in both of a head portion and tail portion of information recorded in the header field.

3 Claims, 35 Drawing Sheets

| U.S. PATENT DOCUMENTS | | | | FOREIGN PATENT DOCUMENTS | | |
|---|---|---|---|---|---|---|
| 6,091,688 A | 7/2000 | Tanoue et al. | | EP | 1 047 049 A2 | 10/2000 |
| 6,091,700 A | 7/2000 | Kobayashi | | JP | 8-30978 | 2/1996 |
| 6,097,695 A | 8/2000 | Kobayashi | | JP | 8-339582 | 12/1996 |
| 6,101,153 A | 8/2000 | Shimazaki et al. | | JP | 10-320833 | 12/1998 |
| 6,111,835 A | 8/2000 | Honma | | JP | 11-25578 | 1/1999 |
| 6,198,711 B1 | 3/2001 | Fujita et al. | | JP | 11-120560 | 4/1999 |
| 6,208,614 B1 | 3/2001 | Kim | | JP | 11-120564 | 4/1999 |
| 6,233,654 B1 * | 5/2001 | Aoki et al. | 711/114 | JP | 11-175979 | 7/1999 |
| 6,262,950 B1 | 7/2001 | Narahara et al. | | JP | 1132860 | 11/1999 |
| 6,262,955 B1 | 7/2001 | Kim | | JP | 11-353810 | 12/1999 |
| 6,445,662 B1 | 9/2002 | Tonami | | JP | 2000-99952 | 4/2000 |
| 6,721,254 B1 | 4/2004 | Yamaguchi | | | | |
| 7,145,848 B2 * | 12/2006 | Konishi et al. | 369/44.32 | * cited by examiner | | |

F I G. 17A  EQUALIZED SIGNAL SAMPLE SERIES AND SERIES SELECTED BY VITERBI DECODER

F I G. 17B  SIGNAL LEVEL OF SELECTED SERIES

F I G. 17C  DECODED DATA

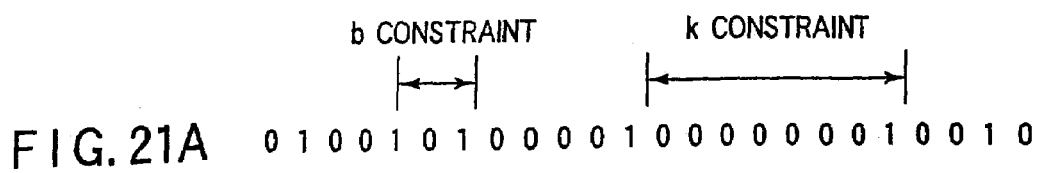
FIG. 21A   0 1 0 0 1 0 1 0 0 0 0 1 0 0 0 0 0 0 0 1 0 0 1 0
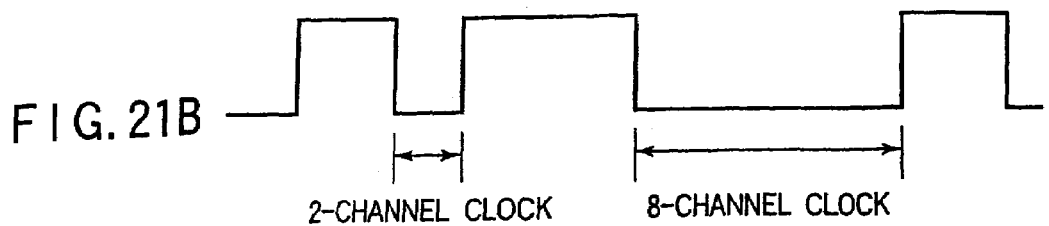
FIG. 21B

FIG. 22A  0   1   0   1   0
FIG. 22B
FIG. 22C
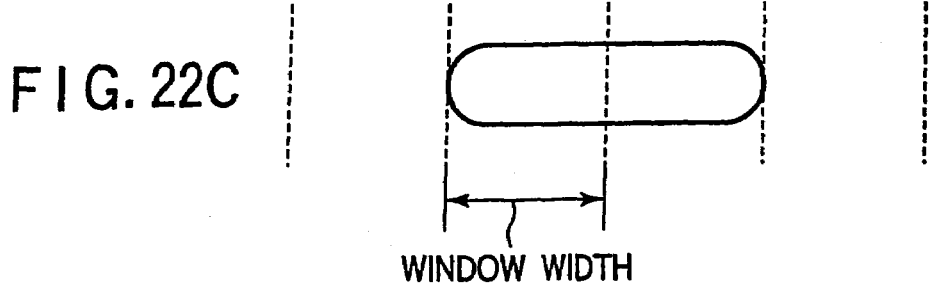
FIG. 22D  0   1   0   0   1   0
FIG. 22E
FIG. 22F
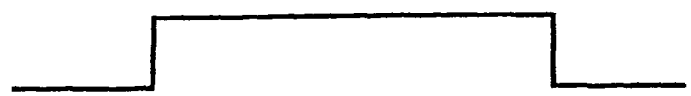
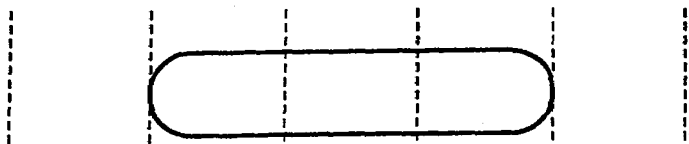

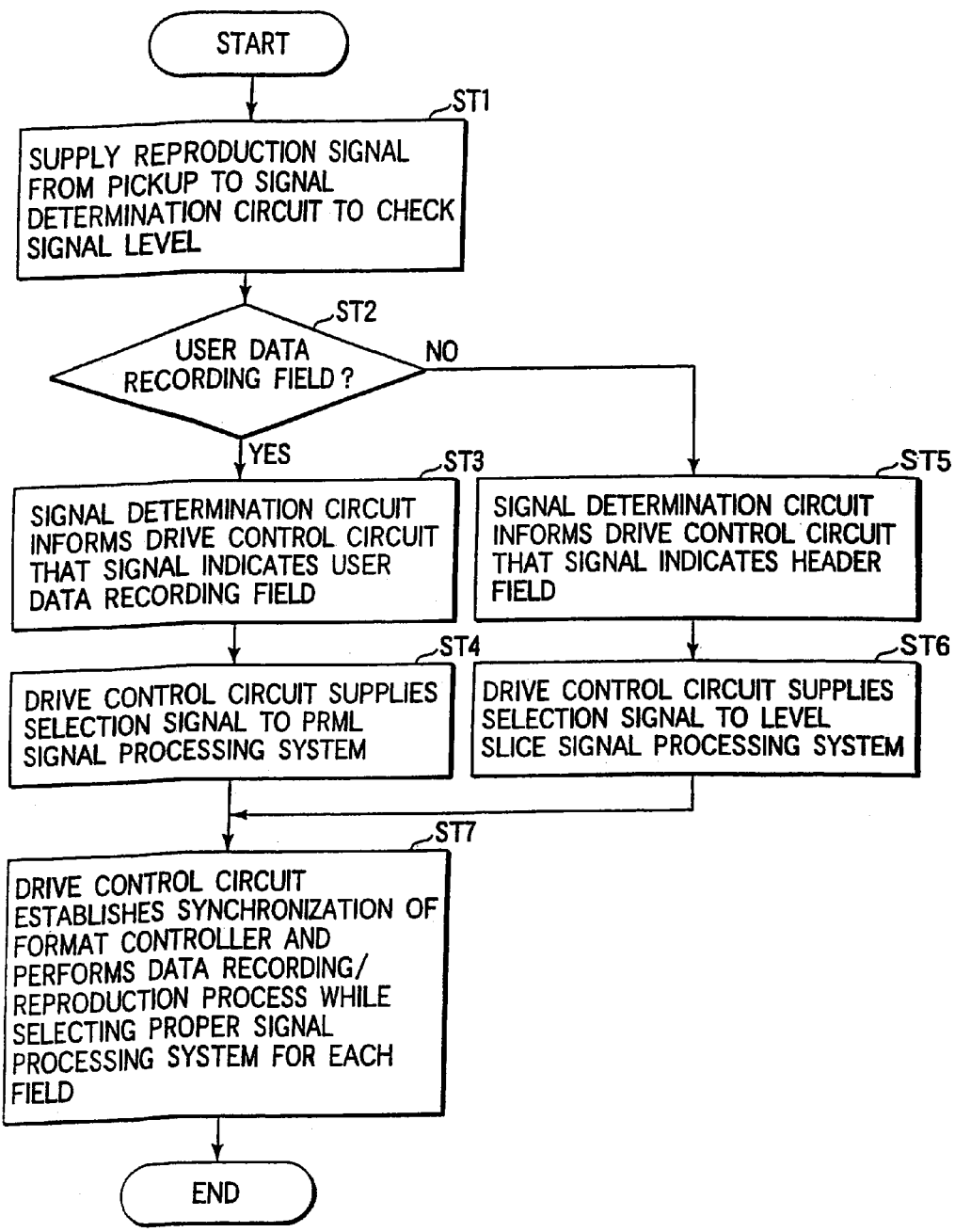
F I G. 23

| HEADER FIELD | | | | | |
|---|---|---|---|---|---|
| VFO1 | AM | PID1 | IED1 | PA1 | AM |
| 36 | 3 | 4 | 2 | 1 | 3 |

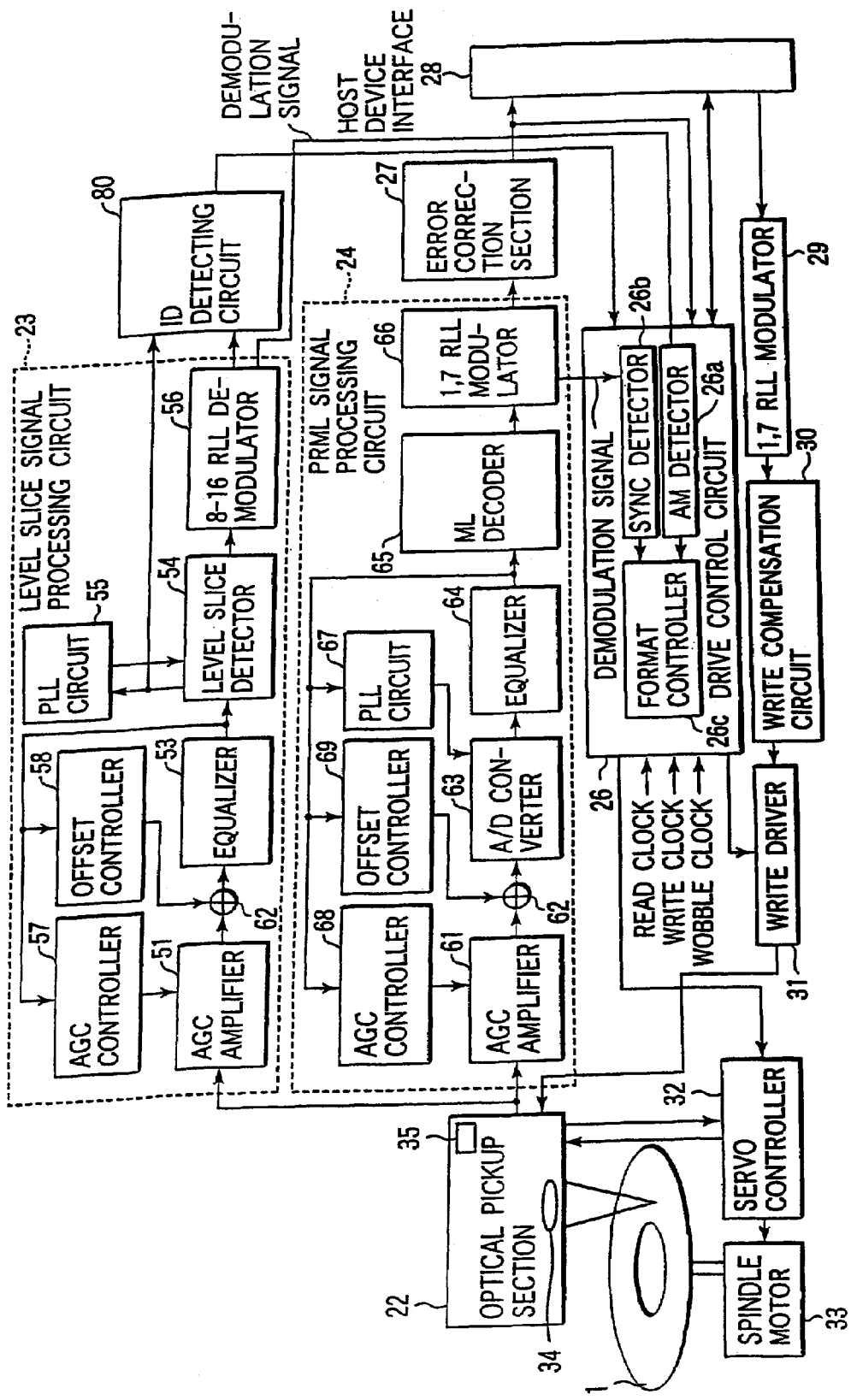
F I G. 31

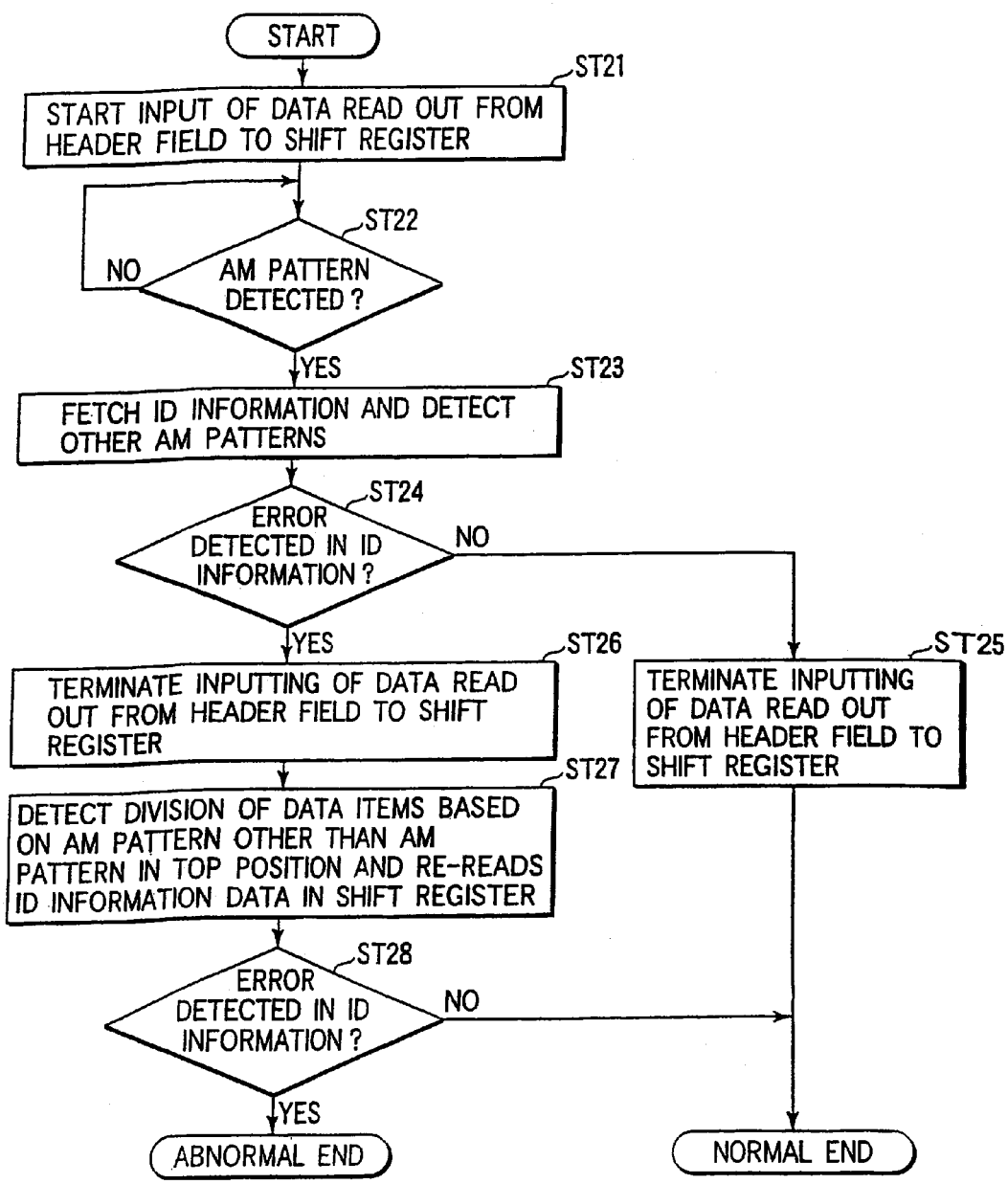
F I G. 32

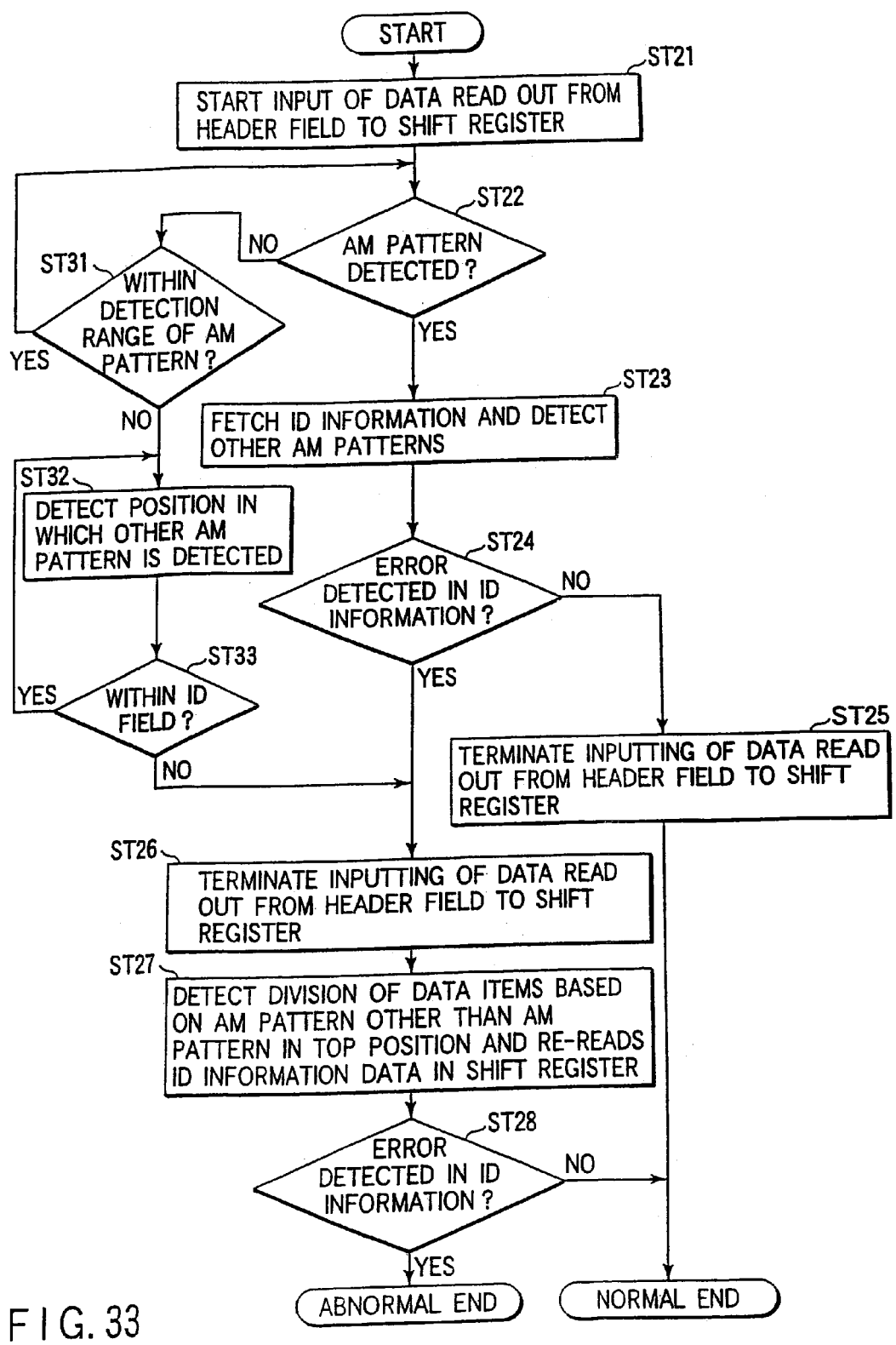
F I G. 33

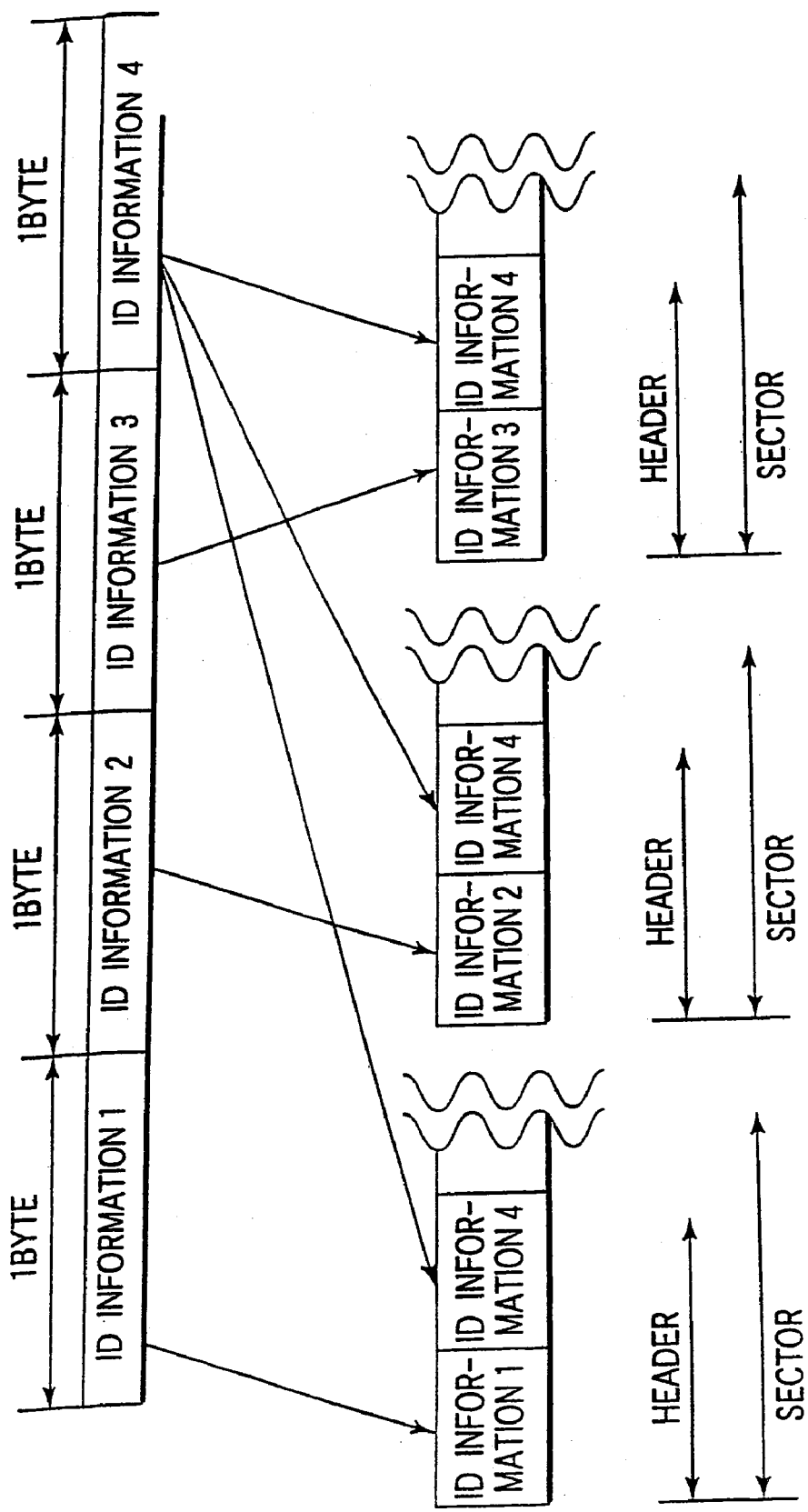
F I G. 34

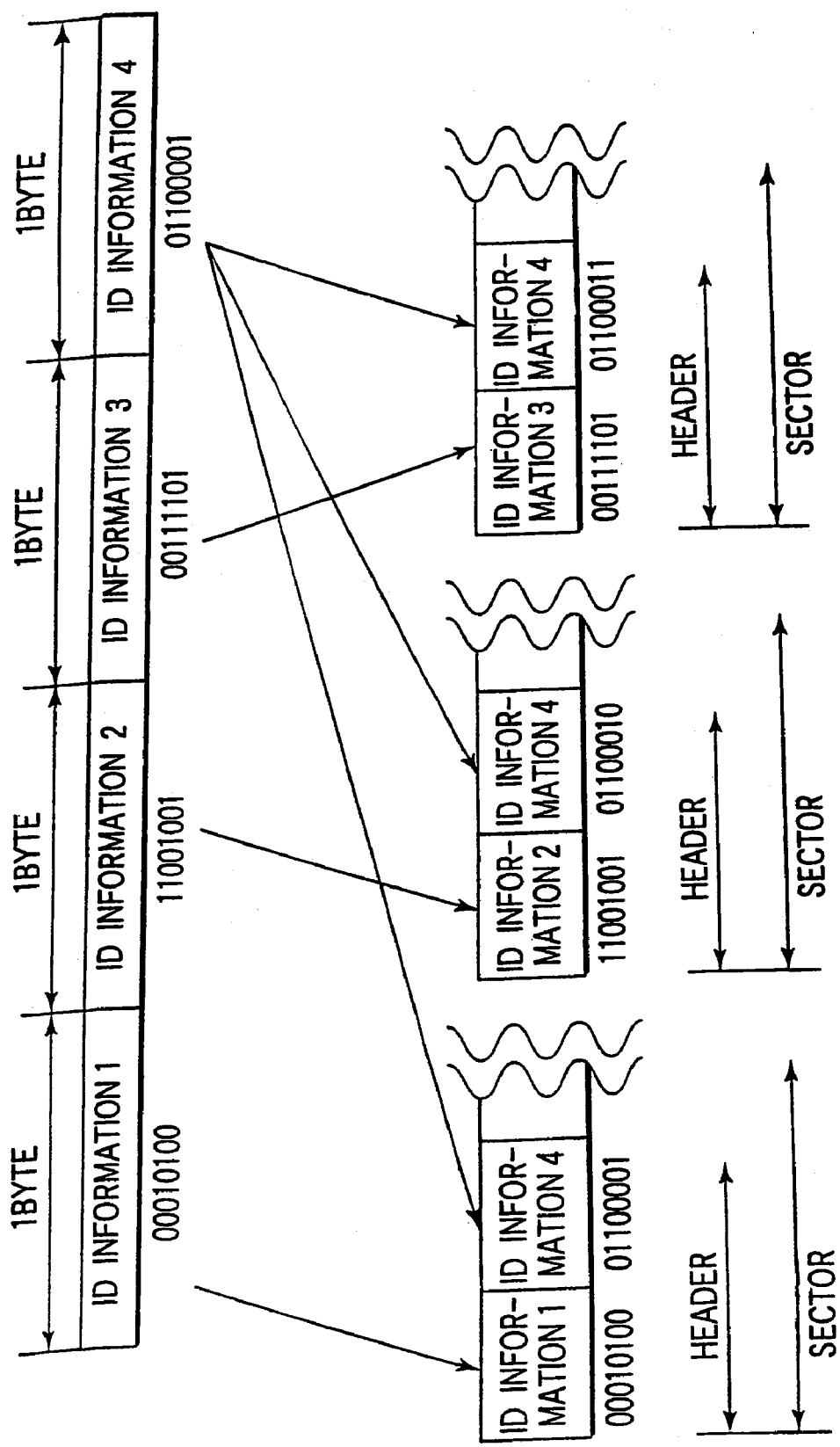
F I G. 35

OPTICAL DISK, OPTICAL DISK RECORDING METHOD AND OPTICAL DISK APPARATUS

CROSS-REFERENCE TO RELATED APPLICATIONS

This application is based upon and claims the benefit of priority from the prior Japanese Patent Application No. 2000-151421, filed May 23, 2000, the entire contents of which are incorporated herein by reference.

BACKGROUND OF THE INVENTION

This invention relates to an optical disk on which data is recorded, a recording method for recording data on the optical disk, and an apparatus for recording and reproducing data on the optical disk.

Recently, DVD systems have been developed to meet the requirements for recording MPEG2 images on one surface of an optical disk having a diameter of 12 cm for two hours or more. Present DVD standards state that the memory capacity of the disk is 4.7 GB for one surface, the track density is 0.74 µm/track, and the linear density is 0.267 µm/bit. A DVD based on the above standards is referred to as a present DVD in this specification.

Reproduction of information recorded on an optical disk such as a DVD is performed by use of an optical head. In the optical head, a light beam emitted from an LD (laser diode) is focused on a pit series formed on the track of the optical disk via an object lens, a light beam reflected from the optical disk is concentrated on a photo-detector by use of a condensing lens and thus a reproduction signal can be attained. The reproduction signal from the photo-detector is input to a reproduction signal processing system and subjected to waveform equalization by an equalizer, and then data is decoded by use of a detector. According to DVD standards, the wavelength of the LD in the optical head is 0.65 µm and the numerical aperture of the object lens is 0.6.

As a higher definition system is required as an image source, it is required to further increase the memory capacity of the DVD in order to record and supply such image data. In order to satisfy the above requirement, the wavelength of the LD is reduced to attain a higher recording density expressed in terms of the wavelength, thus requiring further study on increasing the memory capacity using the PRML (Partial Response Maximum Likelihood) signal process.

In the conventional signal detection method, whether the recorded information is "0" or "1" is determined for each bit. Since the interval between pits or marks becomes shorter as the information recording density is increased, the influence of waveform interference by the adjacent information bit on the reproduction signal also increases.

In order to eliminate the influence of waveform interference, it is necessary to perform a signal process to emphasize the high frequency component of the response characteristic of the recording/reproduction channel and suppress the skirt portion of the response waveform extending to the adjacent bit to a low level.

However, since the noise component is also emphasized if the high frequency component of the response characteristic is emphasized, the number of errors caused by the emphasizing process consequentially increases. Therefore, it is difficult to significantly improve the recording density using the conventional signal processing system.

On the other hand, in the PRML signal processing system, a waveform interference amount between adjacent bits of the reproduction signal waveform is permitted in a range specified by the PR (Partial response) class. Since the reproduced waveform is influenced by the waveform interference from the adjacent bit and distorted, it becomes impossible to determine data by use of only one bit as in the conventional system.

However, since the waveform interference amount is limited to a specified value, signal power dispersed before and after an information bit can be efficiently utilized if a Maximum Likelihood detector using an ML (Maximum Likelihood) determination circuit for selecting data of the most likelihood among the sequence by taking portions before and after the waveform into consideration is used, and therefore, data can be detected at a relatively low error rate. A PR equalizer is used as an equalizing circuit for correcting a deviation of the reproduction waveform from the PR class.

In conventional level slice equalizers, the reproduced waveform is subjected to a waveform equalization process to set the intersecting point between the equalized waveform and a certain threshold level at the center of the window. More specifically, the high frequency component of the reproduced signal is amplified. In the detector, an intersecting point between the equalized waveform and the certain threshold level is detected and if the intersecting point is detected in the window, binary data "1" is output, and if it is not detected, binary data "0" is output. Then, by subjecting the binary data obtained after detection of the intersecting point to an NRZI (Non Return Zero Inverted) conversion process, the decoded data can be attained.

The intersecting point between the equalized waveform and the threshold level does not always exist at the center of the window due to the presence of noise. The standard deviation of intersecting point data standardized according to the window width is called "jitter" and is used as an evaluation standard for optical disks and drive units.

Now, a case wherein an optical disk whose recording density is made higher than present DVDs is reproduced by use of the same optical head as that of the present DVD is considered. If the track density is increased, a reproduction signal may contain a large amount of signal-degrading component called "crosstalk". On the other hand, if the linear density is increased, the reproduced waveform becomes dull. As described before, in the equalizer, since the high frequency component of the reproducing signal is amplified, it is necessary to more strongly amplify the high frequency component when an input reproduced waveform becomes duller. As a result, the equalizer also amplifies the signal-degrading component. Thus, if the waveform slice system is used for the signal detection system, the signal-degrading component is increased irrespective of the method for increasing recording density, therefore data cannot be correctly decoded.

As the reproduction signal processing system used when the SNR (signal/noise ratio) of the reproduction signal is lowered, utilization of a PRML (Partial Response and Maximum Likelihood) system instead of the waveform slice system is studied. In the PRML system, the reproduced waveform is equalized into a waveform having a known correlation between identification points called a PR characteristic by use of the equalizer.

Further, the PRML signal processing system can attain a satisfactory (low) error rate in the case of high recording density. This system is a system for detecting data by use of the correlation between information bits while permitting waveform interference. Therefore, a delay occurs because a sample data series is stored into a bus memory as shown in FIG. 9 which will be described later.

In the process for detecting user data, generally, the above delay does not cause any problems. However, in the header field, since a readout sector number is fed back to the later operation, the influence becomes larger.

That is, in a data writing process, a sector number is read out from the header field, and if the number is determined as a to-be-accessed sector, the readout operation must be immediately interrupted, which affects the write operation. Further, if the number is not the object sector, the write operation is disabled since data will be destroyed. Therefore, if detection of the number necessary for the above determination is delayed, it becomes necessary to take a large GAP field of FIG. 10 which will be described later in order to take a sufficiently long time corresponding to the delay time and thus the format efficiency is degraded accordingly.

In the conventional header field, only one address mark AM for attaining byte synchronization is provided after VFO. The construction is satisfactory when a clock phase pull-in process is completely terminated in the VFO field, but if the phase pull-in process is not completely performed due to a disturbance, for example, data after this cannot be correctly read out.

Therefore, it is required to provide a device capable of suppressing the time delay caused when an address of the header field is read out, reducing the interval of a gap field required between the header field and the recording field and improving the format efficiency.

Further, it is required to provide a device capable of error-free readout of an address of the header field.

This invention can solve the above problems, suppress the time delay caused when an address of the header field is read out, reduce the interval of a gap field required between the header field and the recording field and improve the format efficiency.

Further, this invention can read out an address of the header field without error.

BRIEF SUMMARY OF THE INVENTION

An optical disk of this invention comprises header fields which are provided on tracks of a concentric form or spiral form and in which addresses each indicating a position on the track are previously recorded; and recording fields which respectively follow the header fields and in which preset data is recorded; wherein the recording density of the header field is lower than that of the recording field.

An optical disk recording method of this invention is a method for recording data on an optical disk having header fields which are provided on tracks of a concentric form or spiral form and in which addresses each indicating a position on the track are previously recorded, and recording fields which respectively follow the header fields and in which preset data is recorded; wherein data is recorded in the recording field with a recording density higher than the recording density of the header field.

An optical disk apparatus of this invention for recording data on an optical disk having header fields which are provided on tracks of a concentric form or spiral form and in which addresses each indicating a position on the track are previously recorded, and recording fields which respectively follow the header fields and in which preset data is recorded and reproducing data recorded on the optical disk, comprises first reproduction means for reproducing data in the header field; second reproduction means for reproducing data in the recording field; determining means for determining whether a signal now reproduced is a signal from the header field or a signal from the recording field; and processing means for reproducing data by use of the first reproduction means when the determining means determines that the signal now reproduced is a signal from the header field and reproducing data by use of the second reproduction means when the determining means determines that the signal now reproduced is a signal from the recording field.

An optical disk apparatus of this invention for recording data on an optical disk having header fields which are provided on tracks of a concentric form or spiral form and in which addresses each indicating a position on the track and at least one pattern for detecting the address are previously recorded, and recording fields which respectively follow the header fields and in which preset data is recorded and reproducing data recorded on the optical disk, comprises first reproduction means for reproducing data in the header field; second reproduction means for reproducing data in the recording field; recording means for recording data in the recording field; first detecting means for detecting the pattern used for detecting the address recorded in the header field based on a reproduction signal from the first reproduction means; second detecting means for detecting the address recorded in the header field based on a detection process of the first detecting means; and processing means for reproducing data in a corresponding portion of the recording field by use of the second reproduction means or recording data in a corresponding portion of the recording field by use of the recording means when the address detected by the second detecting means comes to an access position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 21A, 21B are diagrams for illustrating a 1,7 modulation process;

FIGS. 22A to 22F are diagrams showing a difference in the data detection window width according to modulation codes;

FIG. 23 is a flowchart for illustrating the data recording process and data reproducing process;

FIG. 29 is a diagram showing the layout of a header field in another embodiment;

FIG. 31 is a diagram showing the schematic construction of an optical disk apparatus according to another embodiment;

FIG. 32 is a flowchart for illustrating the ID detecting process in the ID detecting section;

FIG. 33 is a flowchart for illustrating the ID detecting process in the ID detecting section;

FIG. 34 is a diagram for illustrating an example of a process for distributing and recording ID information into a plurality of sectors; and FIG. 35 is a diagram for illustrating an example of a process for distributing and recording ID information into a plurality of sectors.

DETAILED DESCRIPTION OF THE INVENTION

There will now be described embodiments of this invention with reference to the accompanying drawings.

Figure 1:
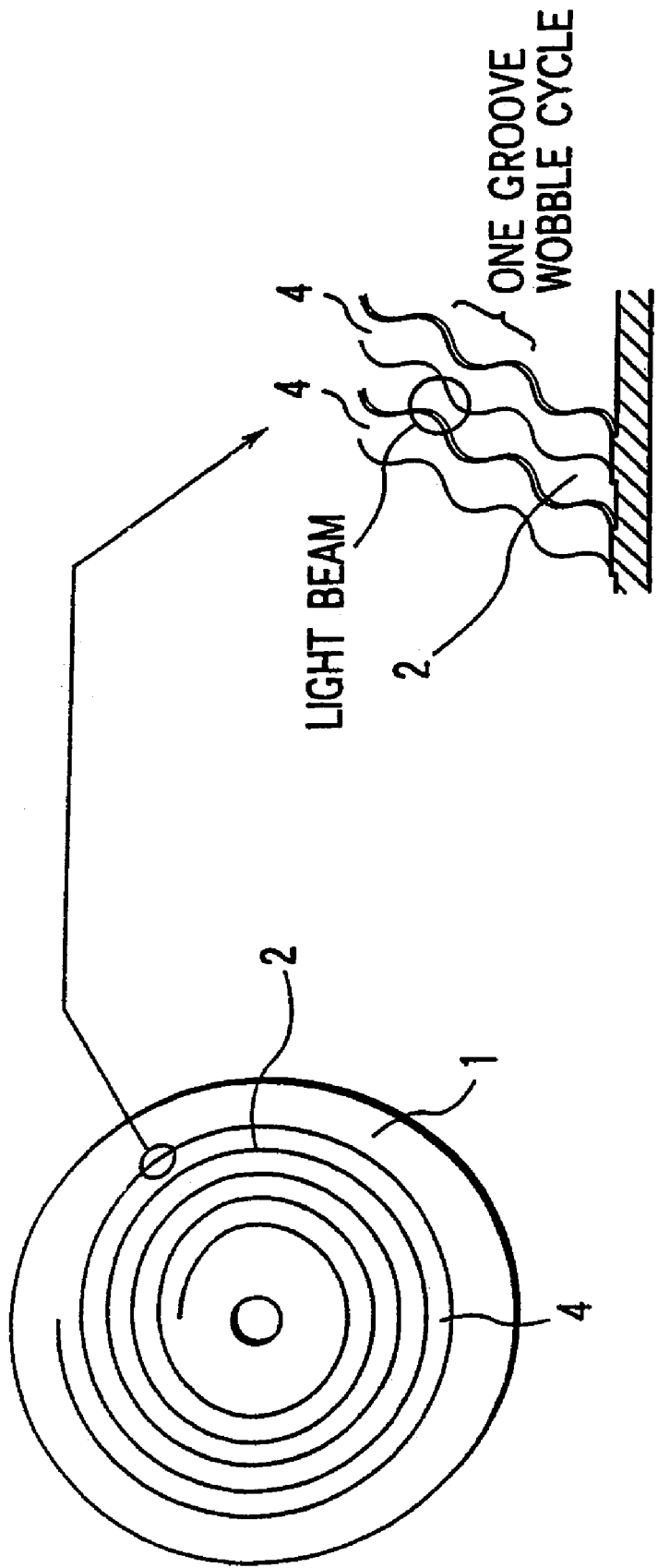
FIG. 1 is a view showing the schematic construction of an optical disk.
Figure 2:
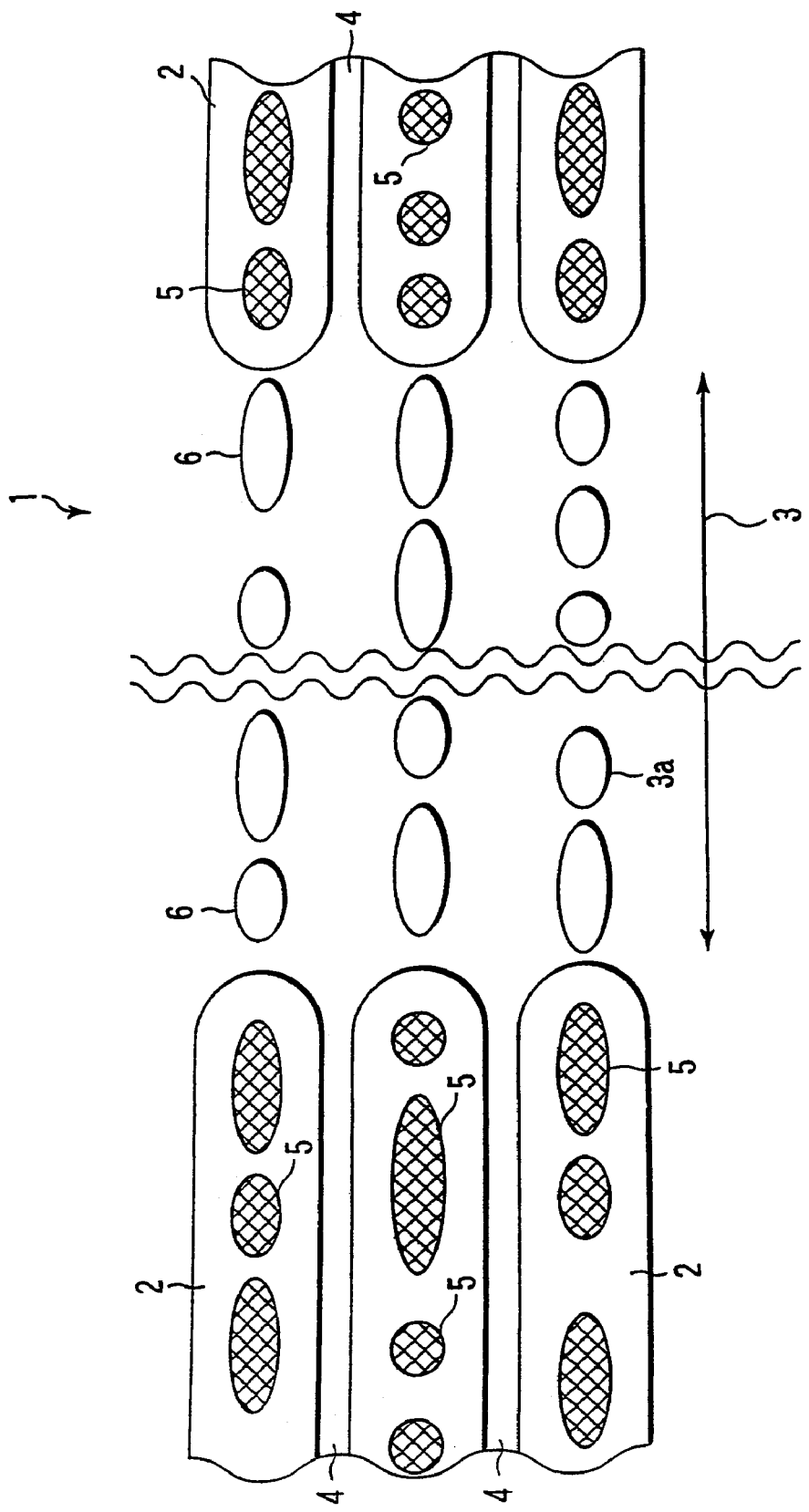
FIG. 2 is a view for illustrating the state of pre-format data of a header field of the optical disk and grooves and lands of the surrounding portion.
Figure 3:
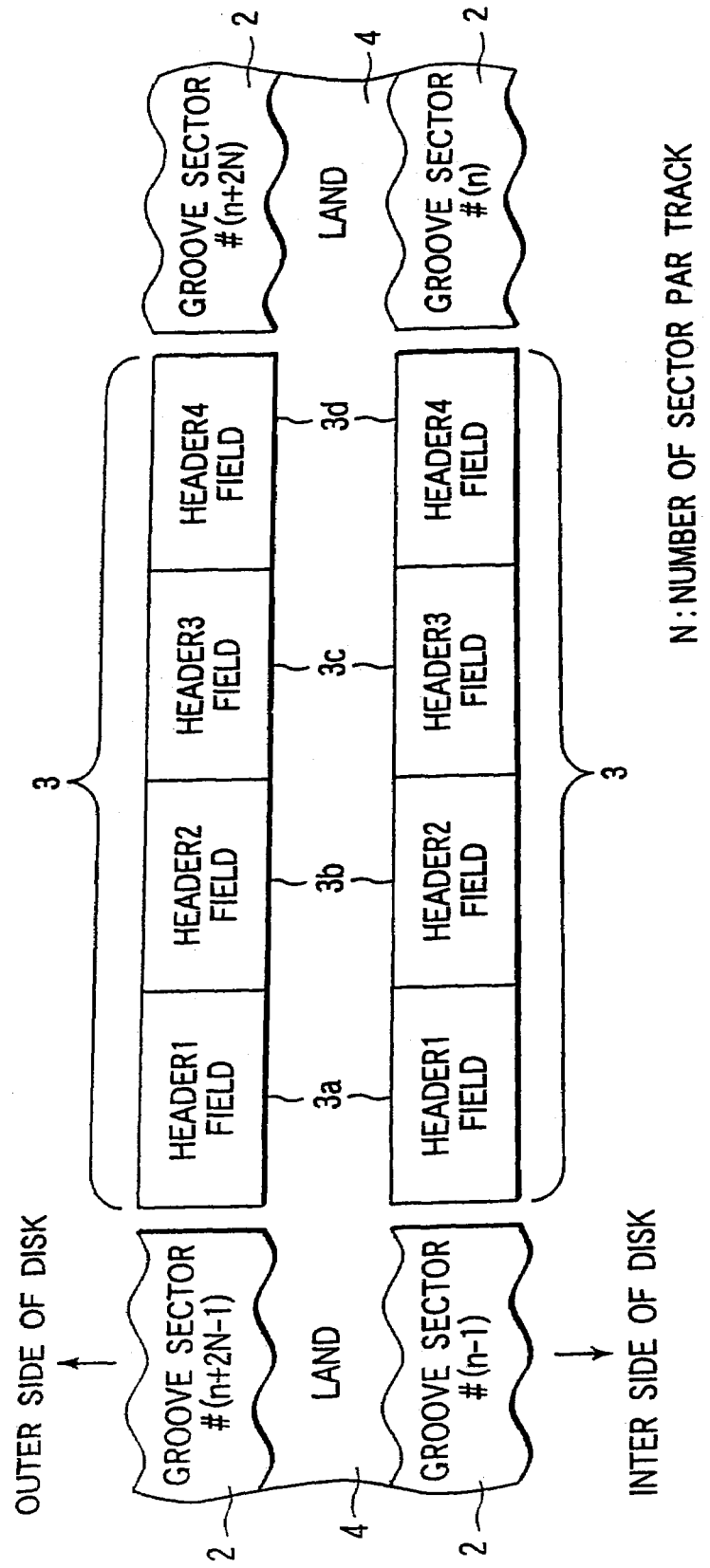
FIG. 3 is a diagram for explaining the state of pre-format data of a header field of the optical disk and grooves and lands of the surrounding portion.

FIGS. 1, 2, 3 show the schematic constructions (one example of the form of a track) of an optical disk 1 of this invention.

The optical disk 1 has grooves 2 which are previously wobbled for tracking and in which data is recorded and header portions (header fields) 3 having pre-pit (emboss pit) strings each indicating a track address or the like. Lands 4 are provided in positions adjacent to the grooves 2.

Data is recorded in the groove 2 by use of recording marks 5 based on a phase change. For example, data is recorded by use of the recording marks 5 based on the 1,7 RLL (Run Length Limited) modulation process. For example, user data is recorded in the groove 2 based on a mark edge form.

Data is recorded in the header field 3 by use of pre-pits 6 previously formed, for example, formed at the time of formation of the grooves. For example, data is recorded by use of the pre-pits 6 based on the 8-16 RLL modulation process. Further, for example, address data is recorded in the header field 3 based on a mark position form.

As shown in FIG. 1, the grooves 2 of the optical disk 1 are previously wobbled in a preset cycle for tracking. For example, grooves for tacking are wobbled in a preset cycle in order to obtain a signal used as a reference at the data recording time.

The header field 3 is formed at the time of formation of the grooves. As shown in FIGS. 2, 3, the header field 3 includes a plurality of header fields 3a, 3b, 3c, 3d each formed of a plurality of pits and is pre-formatted with respect to the grooves 2 as shown in FIGS. 2, 3 and the center of each pit lies on the same line which passes through the center of the amplitude of corresponding grooves 2.

The optical disk 1 is explained by taking a case wherein data is recorded in the grooves as an example, but the optical disk is not limited to this case and the optical disk in which data can be recorded in both of the lands and grooves may be used (DVD-RAM).

Figure 4:
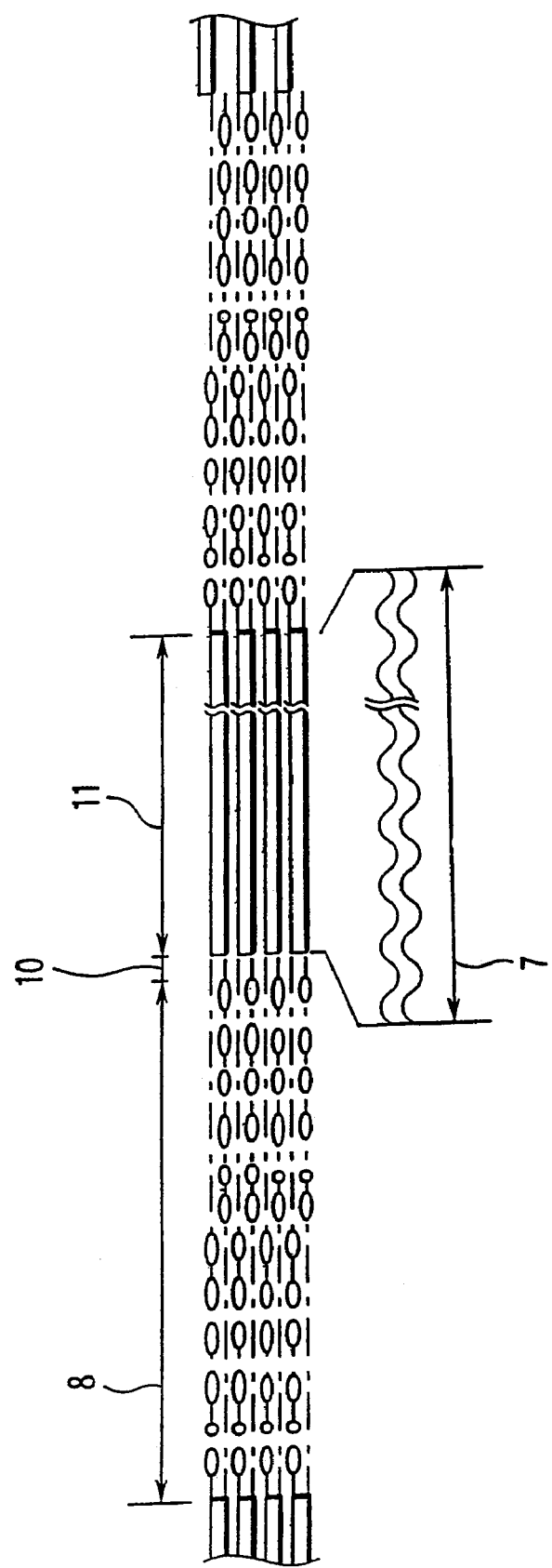
FIG. 4 is a view for illustrating the state of pre-format data of a header field of the optical disk and grooves and lands of the surrounding portion.
Figure 5:
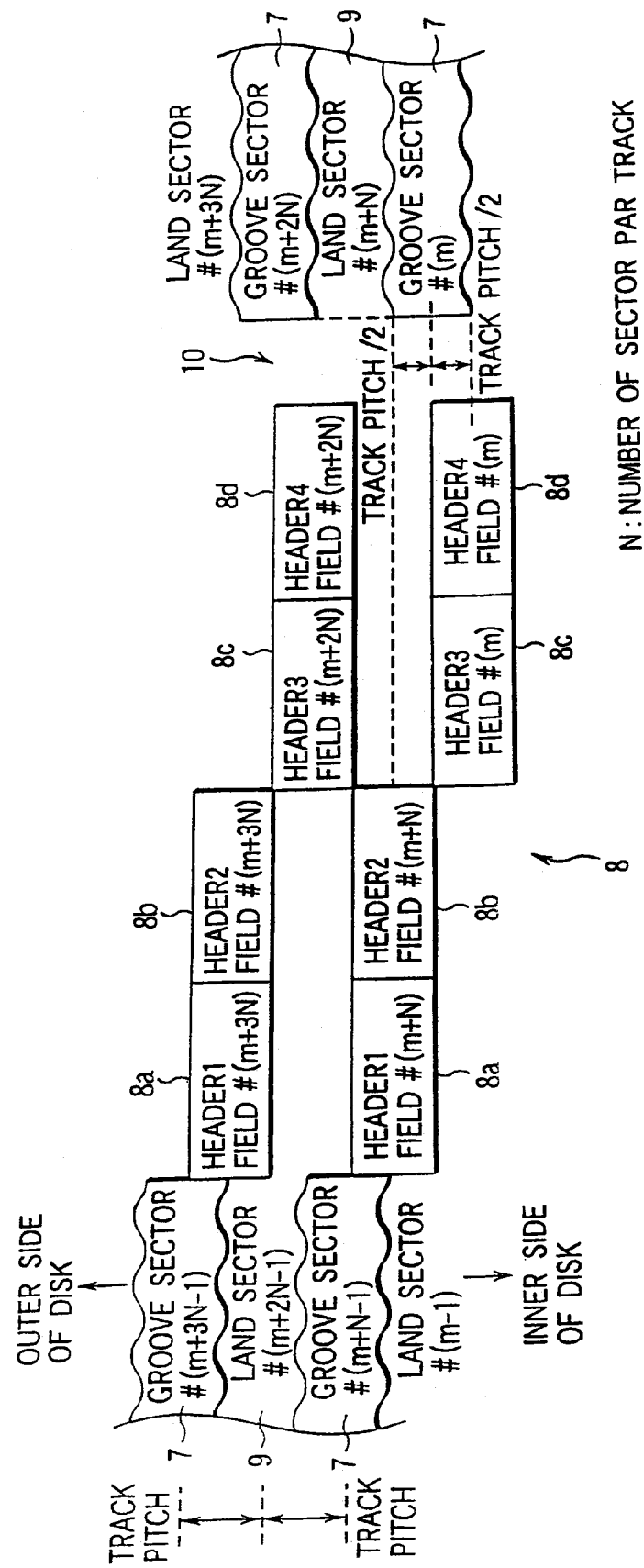
FIG. 5 is a diagram for explaining the state of pre-format data of a header field of the optical disk and grooves and lands of the surrounding portion.
Figure 6:
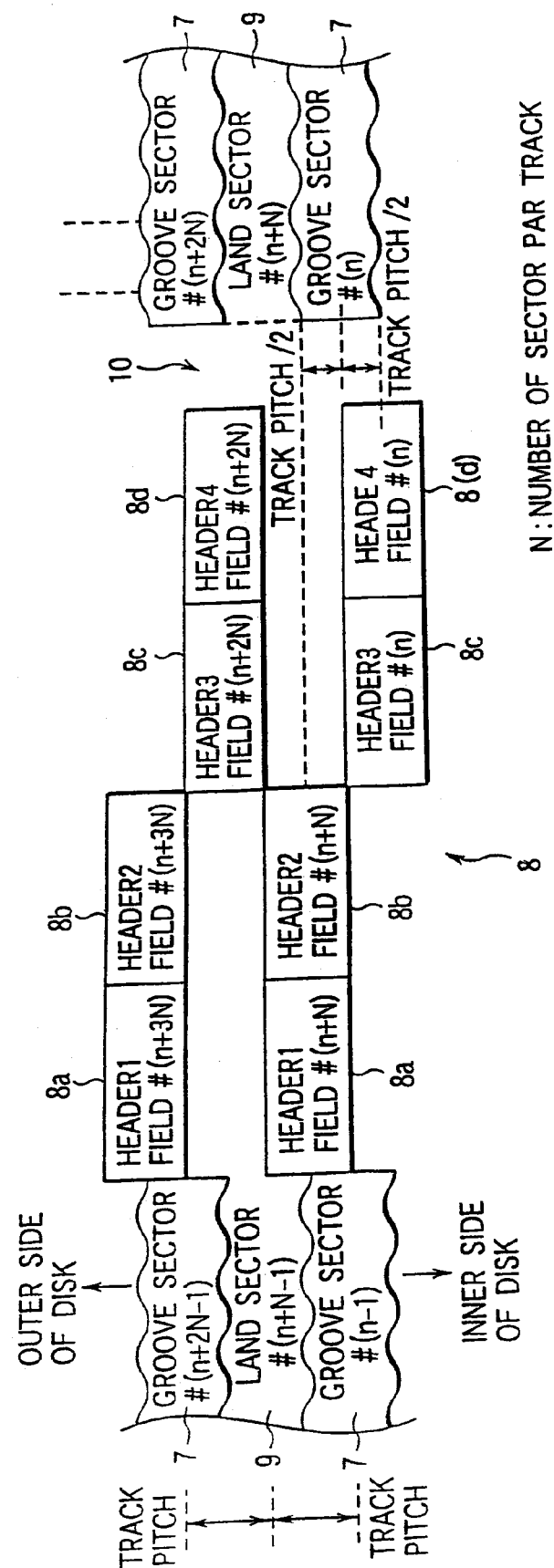
FIG. 6 is a diagram for explaining the state of pre-format data of a header field of the optical disk and grooves and lands of the surrounding portion.

In this case, as shown in FIGS. 4, 5, 6, the optical disk has grooves 7 previously wobbled for tracking and header fields 8 having pre-pit (emboss pit) strings each indicating a track address or the like.

That is, the grooves 7 for tacking are wobbled in a preset cycle in order to obtain a signal used as a reference at the data recording time.

The header field 8 is formed at the time of formation of the grooves. As shown in FIGS. 5, 6, the header field 8 includes a plurality of header fields 8a, 8b, 8c, 8d each formed of a plurality of pits and is pre-formatted with respect to the grooves 7 as shown in FIGS. 5, 6 and the center of each pit lies on the boundary line between the groove 7 and the land 9. FIG. 5 shows the header field 8 attached to the head sector of each track and FIG. 6 shows the header field 8 attached to one of sectors other than the head sector provided in each track.

In this case, the header fields 8 for the grooves and the header fields 8 for the lands are arranged alternately (in a staggered form).

The grooves and lands can be formed in a concentric form instead of the spiral form.

Figure 7:
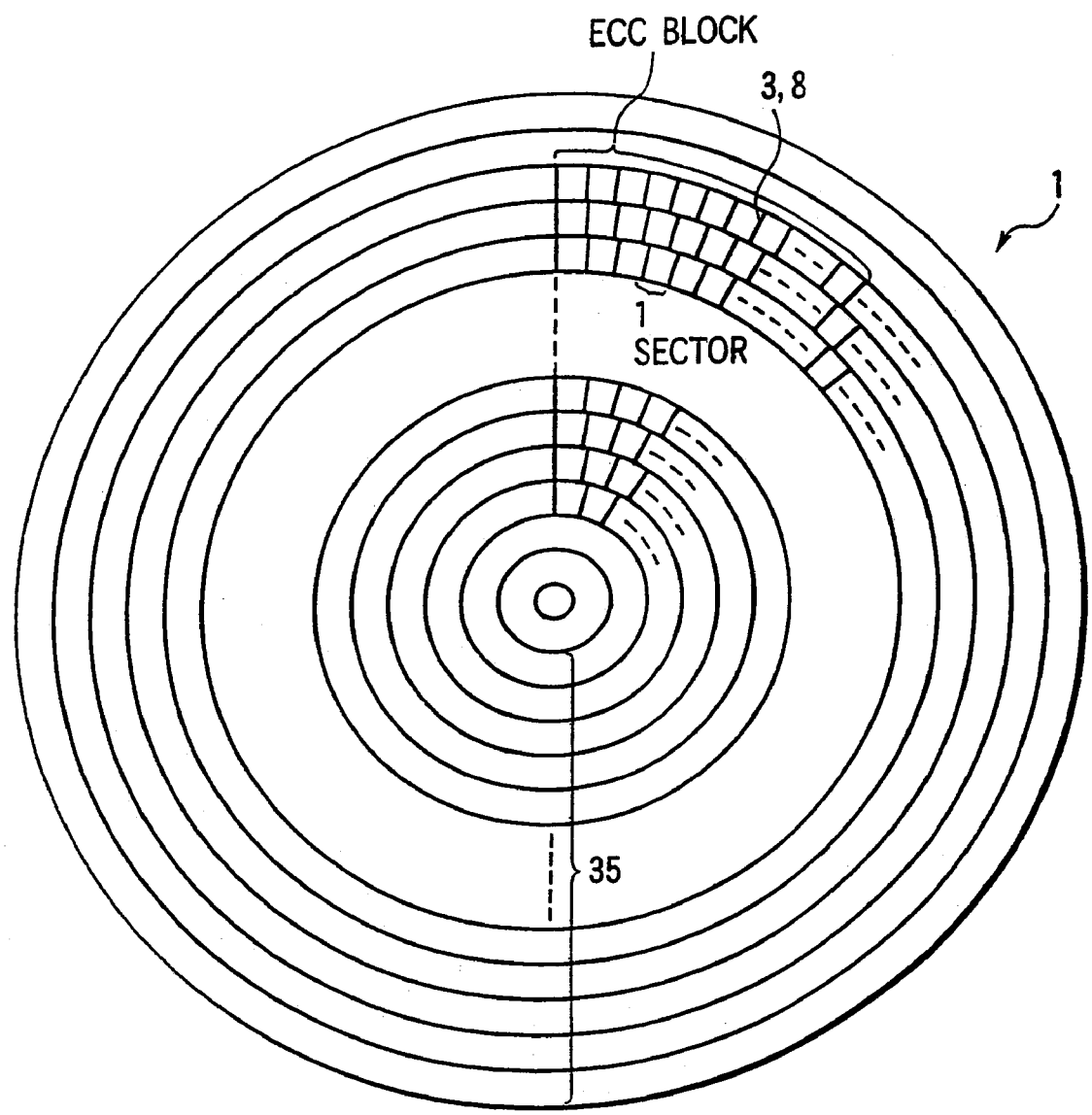
FIG. 7 is a view for illustrating zones of the optical disk.

In this embodiment, it is assumed that data is recorded based on a zone CLV (ZCLV) system. The ZCLV system is a system for dividing the plurality of tracks into several zones and keeping constant the rotating speed of the disk in the same zone. The recording frequency is kept constant for the entire circumference. Therefore, the recording capacity of each track in the same zone is the same. In FIG. 7, the clock signals for the respective zones are the same and the rotating speeds of the optical disk 1 for the respective zones and the numbers of sectors for each track are different.

In this embodiment, the term "sector" is used to indicate a minimum unit which can be used for recording, reproducing and rewriting. In the DVD format, 16 sectors constitute one ECC block. In the construction of the ECC block of the DVD, parity is distributed and recorded in the sectors.

Therefore, data can be rewritten in the sector unit as a binary data string. However, since a defect occurs in the parity if data of only one sector is rewritten, data can be rewritten only in the ECC block unit as significant data. In this respect, it can be said that the rewritable unit is an ECC block, but in this embodiment, the "sector" used as a unit to which access of binary data string can be made is called a "minimum recordable unit".

That is, as shown in FIG. 7, the optical disk 1 is constructed of 35 zones, for example, and the rotating speeds (the reference speed for each zone) of the optical disk 1 for the respective zones and the numbers of sectors for each track are different.

Each zone includes a plurality of (1568) tracks in the radial direction.

In each zone, the rotation speed of the optical disk 1 becomes lower and the number of sectors for each track becomes larger in a portion on the inner side of the optical disk than in a portion on the outer side.

Figure 8:
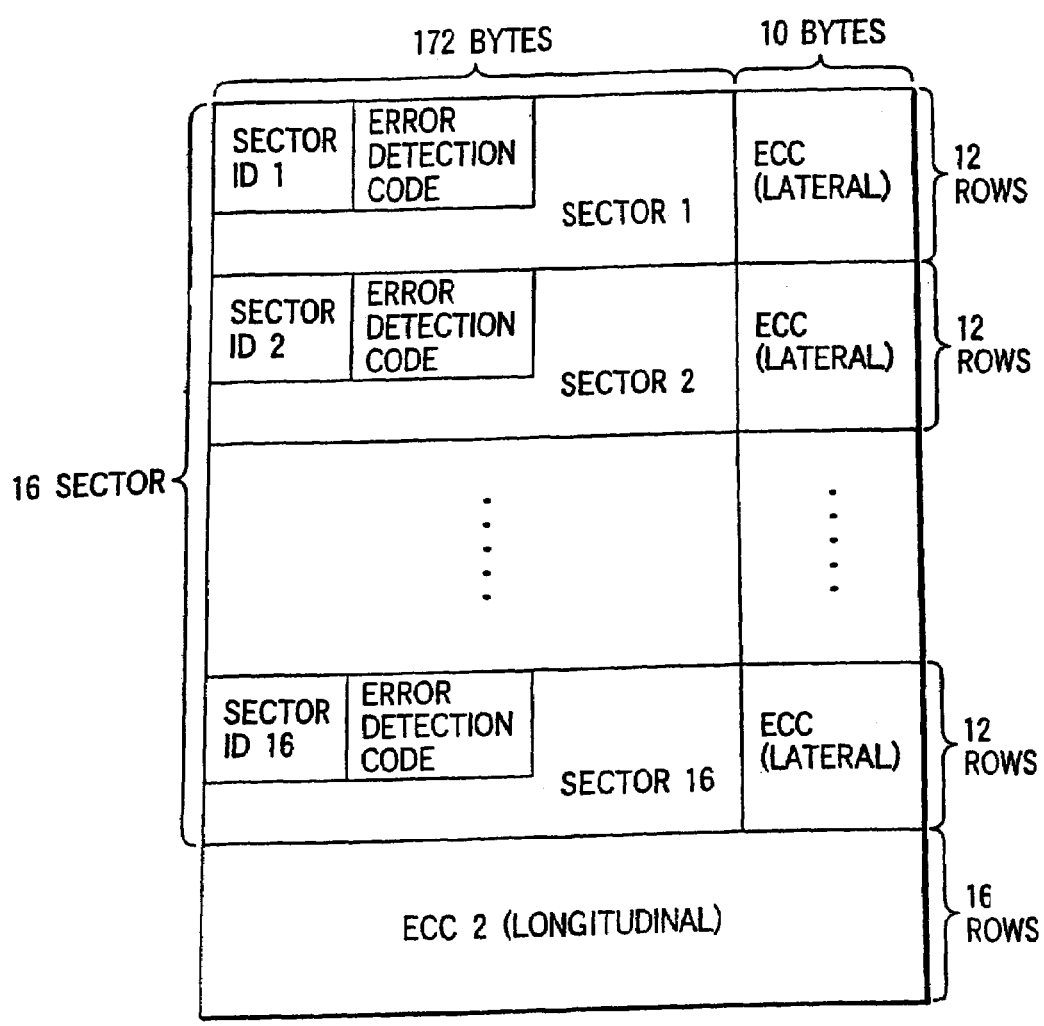
FIG. 8 is a diagram for explaining ECC block data.

As shown in FIG. 8, data is recorded in the tracks of each zone for each ECC (error correction code) block data unit (for example, 38688 bytes) used as a data recording unit.

The ECC block includes 16 sectors in which 2-kilobyte data is recorded, each of sector ID (identification data) items 1 to 16 of 4-byte (32-bit) configuration used as address data is attached to the main data (sector data) together with an error detection code (IED: ID Error Detection Code) of 2-byte configuration for each sector, and lateral ECCs (Error Correction Codes) 1 and longitudinal ECCs 2 used as error correction codes for reproduction data recorded in the ECC block. The ECCs 1, 2 are error correction codes attached to data as redundancy words for ensuring reproduction of data in the case that defects exist in the optical disk 1.

Each sector is constructed by data of 172 bytes×12 rows, and the lateral ECC 1 of 10-byte configuration is attached for each row (line) and the longitudinal ECC 2 of one row with 182-byte configuration is attached. Thus, an error correcting section 27 which will be described later performs an error correction process for each line by use of the lateral ECC 1 and performs an error correction process for each column by use of the longitudinal ECC 2.

When the ECC block is recorded on the optical disk 1, a sync code (2 bytes: 32 channel bits) for taking byte synchronization at the data reproducing time is attached for every preset data amount (for every preset data length interval, for example, 91 bytes: 1456 channel bits) of each sector.

Figure 9:
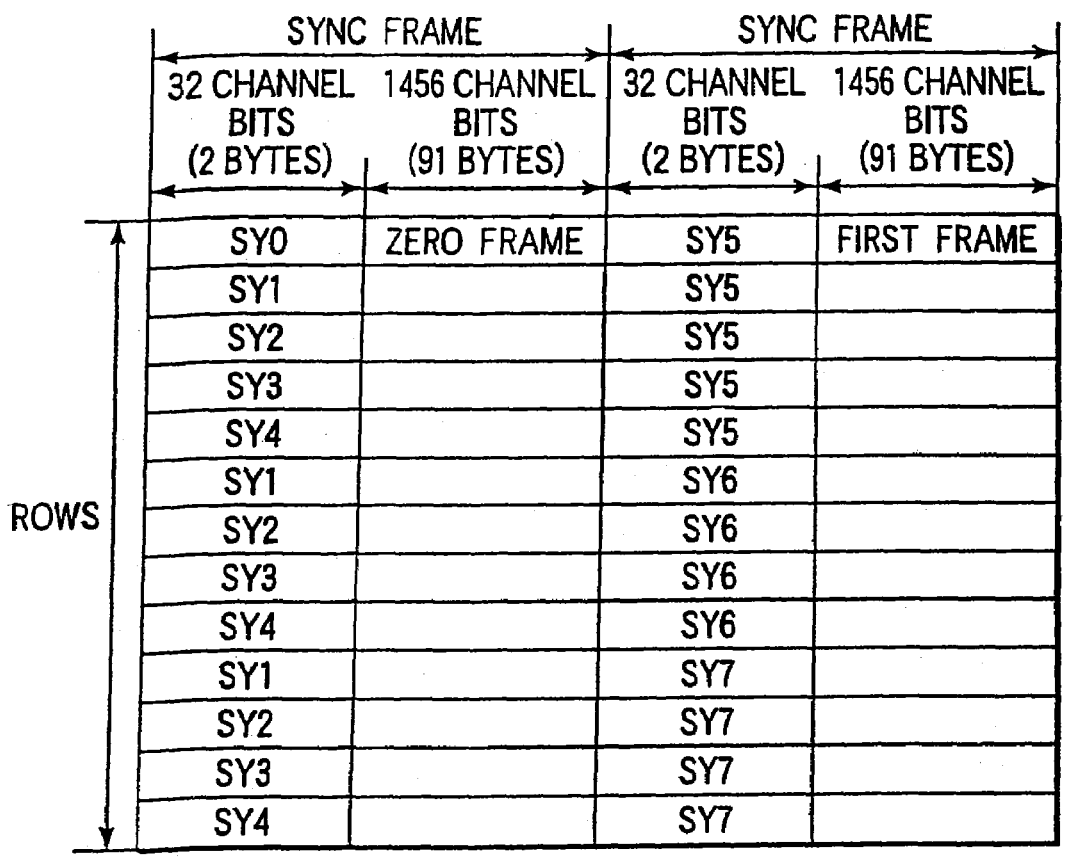
FIG. 9 is a diagram for explaining the frame construction of each sector.

As shown in FIG. 9, each sector is constructed by 26 frames (frame=91 bytes: 1456 channel bits) from frame zero to a 25th frame. The sync code (frame sync signal) attached to each frame is constructed by a specification code (one byte: 16 channel bits) for specifying a frame number and a common code (one byte: 16 channel bits) commonly used for each frame.

FIG. 9 shows the construction of a physical sector in the DVD. It is constructed by 26 SYNC frames starting from a 32-channel bit SYNC code (sync code) and the channel bits are set to 38688 channel bits in total.

Figure 10:
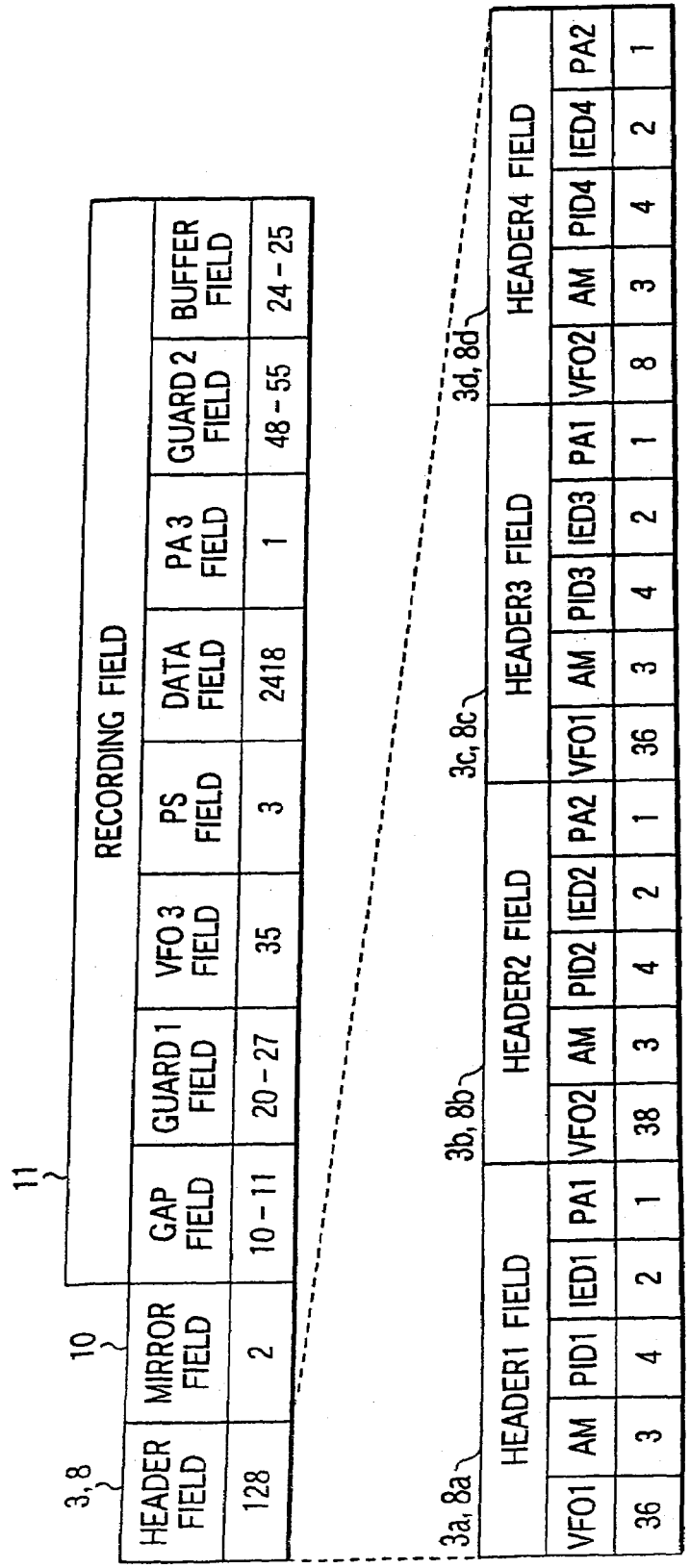
FIG. 10 is a diagram showing a sector format of each sector.

The format of each sector is shown in FIG. 10.

In FIG. 10, one sector is constructed by 2697 bytes and includes a 128-byte header field (corresponding to the header section) 3, 8, 2-byte mirror field 10 and 2567-byte recording field 11.

The channel bit recorded in the header field 3, 8 of the sector takes a form subjected to 8-16 RLL modulation. The channel bit recorded in the recording field 11 of the sector takes a form subjected to 1,7 RLL modulation. In the header field 3, 8, address data is recorded according to the mark position form. In the recording field 11, user data is recorded according to the mark edge form.

The header field 3, 8 is an area in which preset data is recorded when the optical disk 1 is formed.

The header field 3, 8 is constructed by four header fields of header 1 field 3a, 8a, header 2 field 3b, 8b, header 3 field 3c, 8c and header 4 field 3d, 8d.

Each of the header 1 field 3a, 8a to header 4 field 3d, 8d is constructed by 46 bytes or 18 bytes and includes a 36-byte or 8-byte sync code portion VFO (Variable Frequency Oscillator), 3-byte address mark AM (Address Mark), 4-byte address portion PID (Position Identifier), 2-byte error detection code IED (ID Error Detection Code) and one-byte post amble PA (Post Ambles).

The header 1 field 3a, 8a and header 3 field 3c, 8c include a 36-byte sync code portion VFO 1 and the header 2 field 3b, 8b and header 4 field 3d, 8d include an 8-byte sync code portion VFO 2.

The sync code portion VFOs 1, 2 are fields for performing the pull-in process of the PLL, and the sync code portion VFO 1 is obtained by repeatedly recording "00010001" in channel bits by 36 bytes (576 bits in channel bits) (repeatedly recording a pattern with a preset interval) and the sync code portion VFO 2 is obtained by repeatedly recording "100010001" in channel bits by 8 bytes (128 bits in channel bits). The sync code portion VFO 1 is a successive pattern of so-called 4T.

The address mark AM is a 3-byte sync code indicating a position in which a sector address starts and is constructed by a 48-bit channel code. As the pattern of the respective bytes of the address mark AM, a special pattern of "000100010000000000000100010001000000000000000100-01" which does not appear in the data portion is used.

The address portion PIDs 1 to 4 are fields in which sector numbers are recorded as 4-byte addresses. The sector number is a physical sector number indicating a physical position on the track of the optical disk 1, and since the physical sector number is recorded in the mastering process, it cannot be rewritten.

The address portion PID (1 to 4) includes one-byte (8-bit) sector information and 3-byte sector number (physical sector number as a physical address indicating a physical position on the track). The sector information includes a 2-bit reserve field, 2-bit physical ID number field, 3-bit sector type field and one-bit layer number field.

The physical ID number is "1" in the case of PID 1, for example, and is a number indicating the order in which data is overwritten by four times in the header field 3, 8.

In the sector type field, codes indicating the first sector and last sector of the track are recorded.

The error detection code IED is used for the sector address (containing the ID number) and for detecting whether or not an error is present in the readout PID.

The post amble PA contains state information necessary for demodulation and also has a function of polarity adjustment for terminating the header field 51 in space.

The mirror field 10 is used for offset correction of a tracking error signal and timing generation of a land/groove changeover signal, for example.

The recording field 11 includes a 10-byte or 11-byte gap field, 20-byte to 27-byte guard 1 field, 35-byte VFO 3 field, 3-byte pre-synchronous code (PS) field, 2418-byte data field, one-byte post amble 3 (PA3) field, 48-byte to 55-byte guard 2 field and 24-byte or 25-byte buffer field.

The gap field is a field in which nothing is written.

The guard 1 field is a field for preventing terminal deterioration caused at the repetitive recording time inherent in a phase change recording medium from giving an influence on the VFO 3 field.

The VFO 3 field is used for repeatedly recording "10001000111" in channel bits by 35 bytes (560 bits in channel bits) in the PLL lock field.

The PS (pre-synchronous code) field is a synchronization field for connection to the data field.

The data field is a field including data ID, data ID error detection code IED, sync code, ECC (Error Correction Code), EDC (Error Detection Code) and user data. The data ID is sector data of 4-byte (32-channel bit) configuration of each sector. The data ID error detection code IED is an error detection code of 2-byte (16-bit) configuration for data ID.

The PA (post amble) 3 field is a field containing state information necessary for demodulation and indicating the end of the last byte of the preceding data field.

The guard 2 field is a field which prevents terminal deterioration from influencing the data field. Terminal deterioration, inherent in phase change recording media, is caused by repetitive recording.

The buffer field is a field provided for absorbing variations in rotation of the optical disk 1 so as to prevent the recording field from extending into the next header field 3, 8.

The reason why the gap field is expressed to be constructed by 10 or 11 bytes is that random shifting is performed. Random shifting shifts the data write starting position to reduce repetitive recording degradation of the phase change recording medium. The length of random shifting is adjusted by use of the buffer field lying in the last portion of the recording field and the total length thereof in one sector is a constant 2697 bytes.

Figure 11:
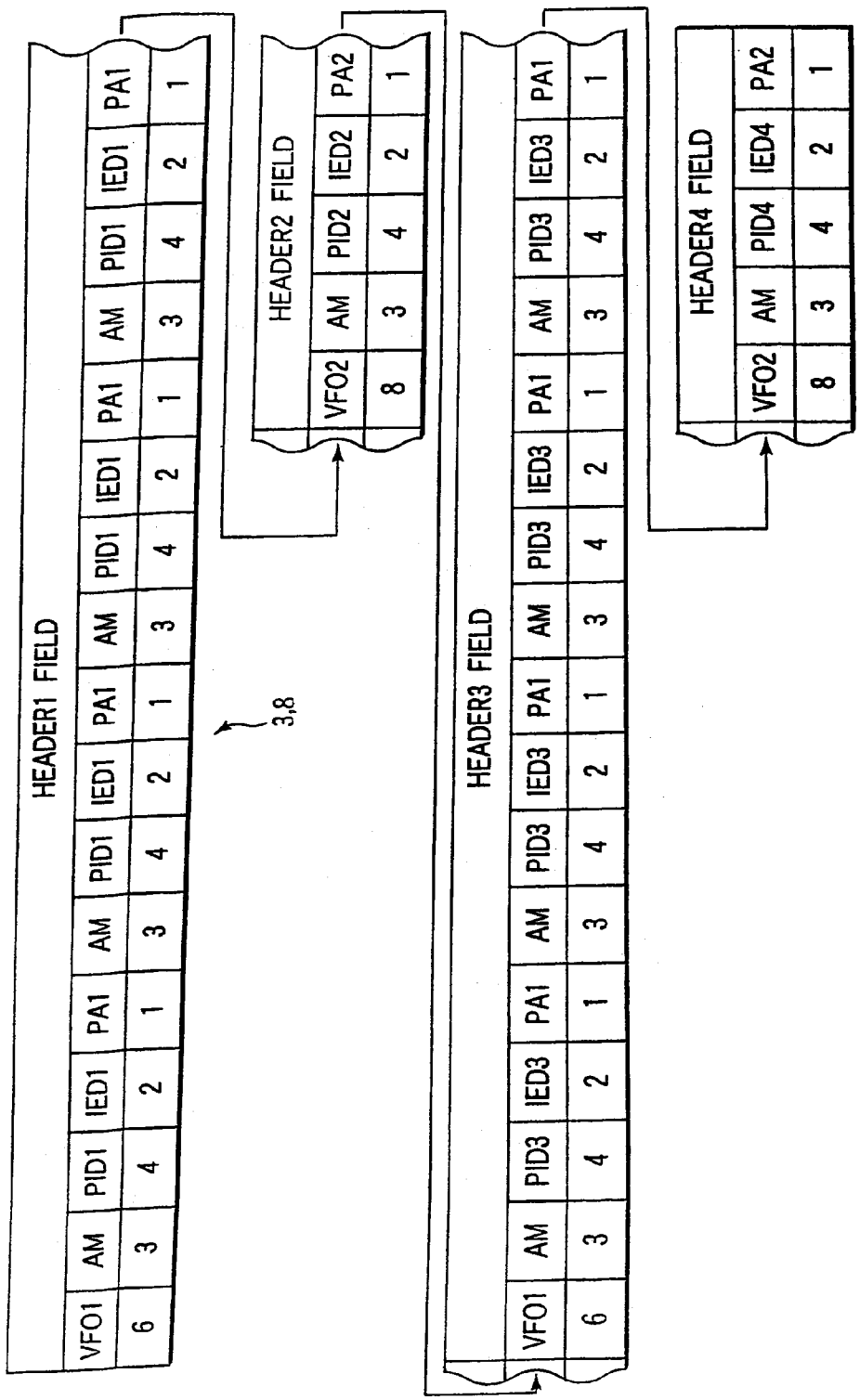
FIG. 11 is a diagram showing a format of another embodiment of the header field.

Next, anther embodiment of the header field 3, 8 is explained with reference to FIG. 11. Portions which are the same as those of FIG. 10 are denoted by the same reference numerals and the explanation thereof is omitted.

The header field 3, 8 includes four header fields of header 1 field 3a', 8a', header 2 field 3b, 8b, header 3 field 3c', 8c' and header 4 field 3d, 8d.

The header 1 field 3a', 8a' is constructed by 46 bytes and includes a 6-byte sync code portion VFO arranged in the top portion and a 3-byte address mark AM, 4-byte address portion PID 1, 2-byte error detection code IED 1 and one-byte post amble PA 1 which are repeatedly recorded by four times after the VFO.

The header 3 field 3c', 8c' is constructed by 46 bytes and includes a 6-byte sync code portion VFO arranged in the top portion and a 3-byte address mark AM, 4-byte address portion PID 3, 2-byte error detection code IED 3 and one-byte post amble PA 1 which are repeatedly recorded by four times after the VFO.

Therefore, a total of 10 bytes of AM, PID, IED, PA is repeatedly recorded by four times after the 6-byte sync code portion VFO. As a result, the pull-in time of the PLL becomes longer than in a case wherein only the exclusive VFO pattern (36 bytes) is used, but since the possibility of reading ID information repeatedly recorded can be enhanced if the margin of the header field is large, it becomes more advantageous than the construction of FIG. 10.

Next, an optical disk apparatus 21 for dealing with the optical disk 1 is explained with reference to FIG. 12.

The optical disk apparatus 21 records data on the optical disk 1 and reproduces data recorded on the optical disk 1 while it rotates the optical disk 1 at different speeds for respective zones.

Figure 12:
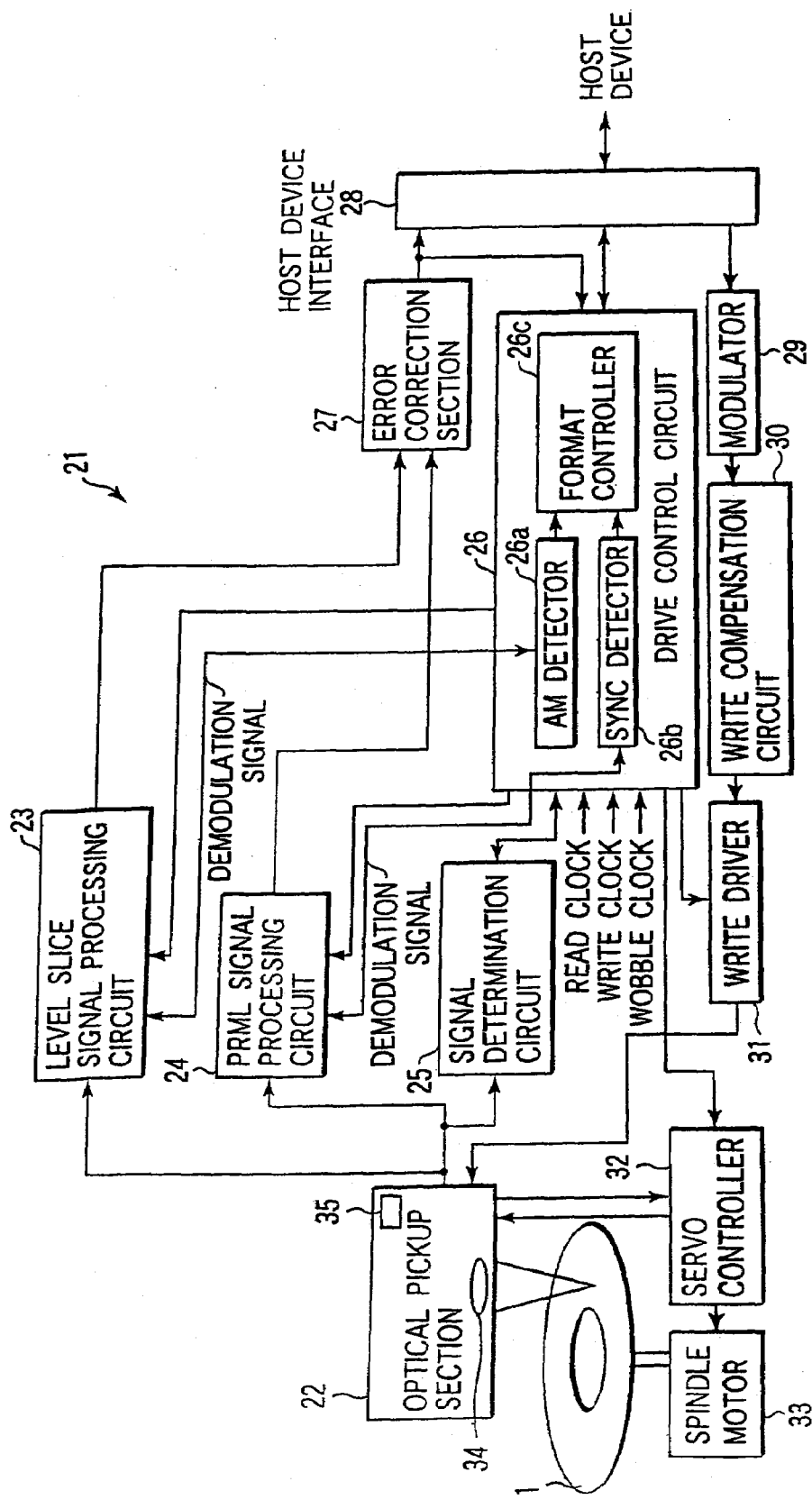
FIG. 12 is a diagram showing the schematic construction of an optical disk apparatus.

As shown in FIG. 12, the main portion of the optical disk apparatus 21 includes an optical pickup section (optical head) 22, level slice signal processing circuit 23, PRML signal processing circuit 24, signal determining circuit 25, drive control circuit 26, error correcting section 27, host device interface 28, modulator 29, write compensation circuit 30, write driver 31, servo controller 32 and spindle motor 33.

The optical pickup section 22 has an object lens 34. In the optical head section 22, a semiconductor laser unit (not shown) is provided to face the object lens 34 and energized by the write driver 31 used as a laser control unit to generate laser rays of an appropriate wavelength. When the semiconductor laser unit is energized, laser light properly applied to the optical head 1 is directed to the object lens 34 and converged on the optical disk 1 by the object lens 34. Data is written on (creation of a mark string: data is written on the optical disk 1 according to the interval between variable length marks and the length of each variable length mark) or reproduced from the optical disk 1 by use of the converged laser light.

Setting contents of the write driver 31 are set by the write compensation circuit 30 and are different depending on the reproduction power for obtaining a reproducing signal, recording power for recording data and erasing power for erasing data. The laser light has three power levels: the reproduction power, recording power and erasing power, and the semiconductor laser unit is energized by the write driver 31 so as to emit laser light of appropriate power.

The optical disk 1 is directly carried into the apparatus by use of a tray (not shown) or carried into the apparatus after being received into a disk cartridge (not shown) so that the optical disk 1 will be arranged to face the object lens 34. A tray motor (not shown) for driving the above tray is provided in the apparatus. Further, the loaded optical disk 1 is rotatably held on the spindle motor 33 by a clamper (not shown) and rotated by the spindle motor 33.

Figure 13:
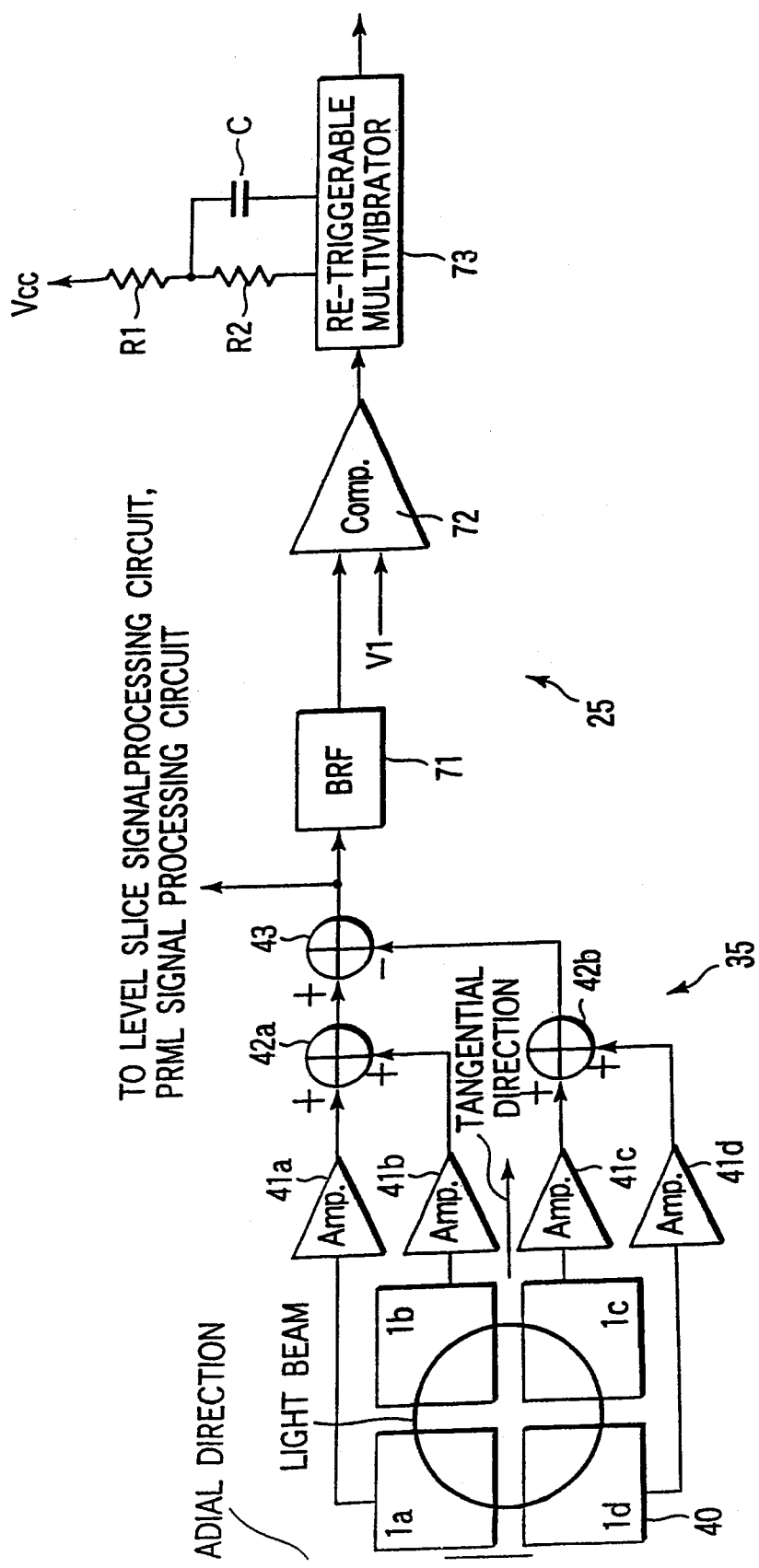
FIG. 13 is a circuit diagram showing the schematic construction of a signal detecting section and signal determining circuit.

The optical pickup section 22 has a signal detecting section 35. As shown in FIG. 13, the signal detecting section 35 includes amplifiers 41a, 41b, 41c, 41d for converting current signals of detection signals (Ia, Ib, Ic, Id) from a photo-detector 40 used as a photo-detector for detecting laser light into voltage signals, an adder 42a for adding together the signals from the amplifiers 41a, 41b, an adder 42b for adding together the signals from the amplifiers 41c, 41d, and a subtracter 43 for subtracting the signal output from the adder 42b from the signal output of the adder 42a.

A signal from the subtracter 43 or an output signal of the signal detecting section 35 is output to the level slice signal processing circuit 23 for reproducing data of the header field 3, 8, and to the PRML signal processing circuit 24 for reproducing data of the recording field 11 and the signal determining circuit 25.

Further, a servo signal (track error signal, focus error signal) is generated by a signal processing circuit (not shown) based on the signals from amplifiers 81a, 81b, 81c, 81d and output to the servo controller 32.

As a method for optically detecting a focus deviation amount, the following methods are given, for example.

[Astigmatism Method]

This is a method for detecting variations in laser light irradiated on to the photo-detector 40 by use of an optical element (not shown) for causing astigmatism to occur which is disposed on an optical detection path of laser light reflected from a light reflecting film or light reflective recording film of the optical disk 1. The photo-detecting area is divided into four areas along diagonal lines. A difference between the sums of the detection signals obtained from the respective diagonal detection areas is derived by a signal processing circuit (not shown) and used as a focus error detection signal (focus signal).

[Knife-Edge Method]

This is a method using a knife edge disposed for non-symmetrically shielding part of the laser light reflected from the optical disk 1. The photo-detecting area is divided into to two areas and the difference between the detection signals obtained from the respective detection areas is derived as a focus error detection signal.

Generally, either the astigmatism method or the knife-edge method is used.

The optical disk 1 has tracks in a spiral form or concentric form and information is recorded on the track. Information is reproduced or recorded/erased by tracing a focused light spot along the track. In order to stably trace the focused light spot along the track, it is necessary to optically detect a relative positional deviation between the track and the focused light spot.

As the track deviation detecting method, the following methods are generally used.

[Differential Phase Detection Method]

A variation in the intensity distribution of laser light reflected from a light reflecting film or light reflective recording film of the optical disk 1 on the photo-detector 40 is detected. The photo-detecting area is divided into four areas along diagonal lines. A phase difference between the sums of the detection signals obtained from the respective diagonal detection areas is derived by a signal processing circuit (not shown) and used as a track error detection signal (tracking signal).

[Push-Pull Method]

A variation in the intensity distribution of laser light reflected from the optical disk 1 on the photo-detector is detected. The photo-detecting area is divided into two areas and a difference between the detection signals obtained from the respective detection areas is derived and used as a track error detection signal.

[Twin-Spot Method]

For example, a diffraction element is disposed in a light transmission system between the semiconductor laser element and the optical disk 1 to divide light into a plurality of wave surfaces and detect a variation in the reflected light amount of ±primary diffracted light applied to the optical disk 1. A photo-detecting area for individually detecting the reflected light amount of +primary diffracted light and the reflected light amount of −primary diffracted light is disposed in addition to the photo-detecting area for detecting the reproducing signal and a track error detection signal is obtained by deriving a difference between the detection signals.

The signal processing system on the reproducing side has two systems including a system (level slice signal processing circuit 23) for processing a signal from the header field 3, 8 by use of the level slice system having less detection delay and a system (PRML signal processing circuit 24) for processing a signal from the recording field 11 for recording user data by use of the PRML signal processing system which can attain high-density recording.

Figure 14:
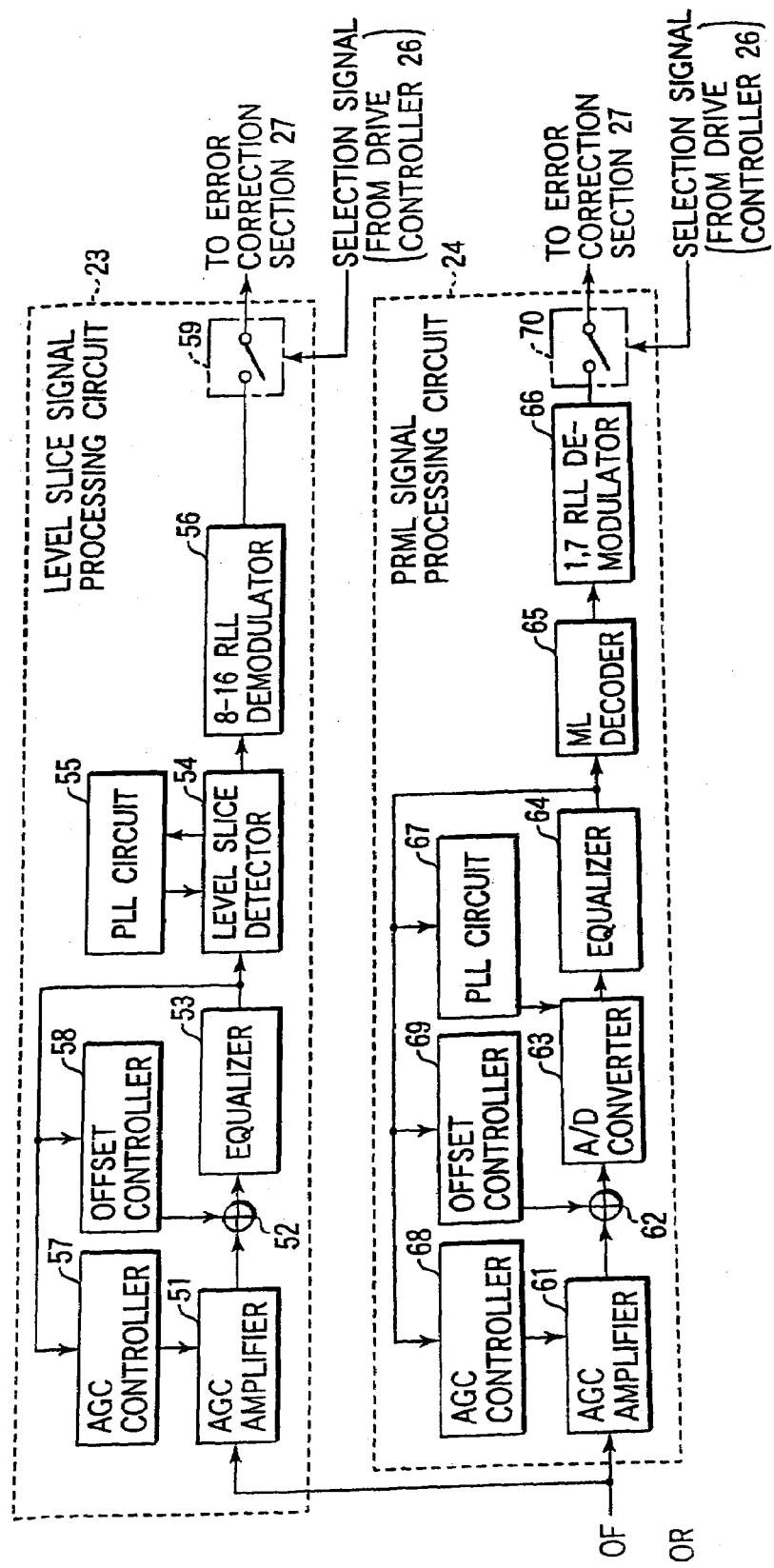
FIG. 14 is a block diagram showing a schematic construction of a level slice signal processing circuit and PRML signal processing circuit.

As shown in FIG. 14, the level slice signal processing circuit 23 includes an AGC (Automatic Gain Control) amplifier 51, adder 52, equalizer 53, level slice detector 54, PLL circuit 55, 8-16 RLL demodulator 56, AGC controller 57 and offset controller 58.

The AGC amplifier 51 corrects the level of a signal from the signal detector 35 according to a control signal from the AGC controller 57 and outputs the corrected signal to the adder 52. The adder 52 adds the signal from the AGC amplifier 51 with an offset signal from the offset controller 58 and outputs the result of addition to the equalizer 53.

The equalizer 53 subjects the waveform (reproduced waveform) of the reproduction signal from the adder 52 to waveform equalization so that an intersecting point between the equalized waveform and a certain threshold level will be set at the center of the window and then outputs the result of equalization to the level slice detector 54, AGC controller 57 and offset controller 58.

The level slice detector 54 detects an intersecting point between the equalized waveform from the equalizer 53 and the threshold level according to a channel clock from the PLL circuit 55, and if the intersecting point is detected in the window, binary data "1" is output to the 8-16 RLL demodulator 56, and if the intersecting point is not detected in the window, binary data "0" is output to the 8-16 RLL demodulator 56.

The PLL circuit 55 generates a channel clock based on a signal from the level slice detector 54 and outputs the channel clock to the 8-16 RLL demodulator 56.

The 8-16 RLL demodulator 56 demodulates binary data from the level slice detector 54 based on the 8-16 RLL code.

The AGC controller 57 corrects the signal of the AGC amplifier 51 based on the equalized waveform from the equalizer 53.

The offset controller 58 outputs an offset value to the adder 52 based on the equalized waveform from the equalizer 53.

The waveform slice system used as the signal processing system by the level slice signal processing circuit 23 is explained with reference to the operation waveform diagrams of FIGS. 15A to 15G.

Figure 15:
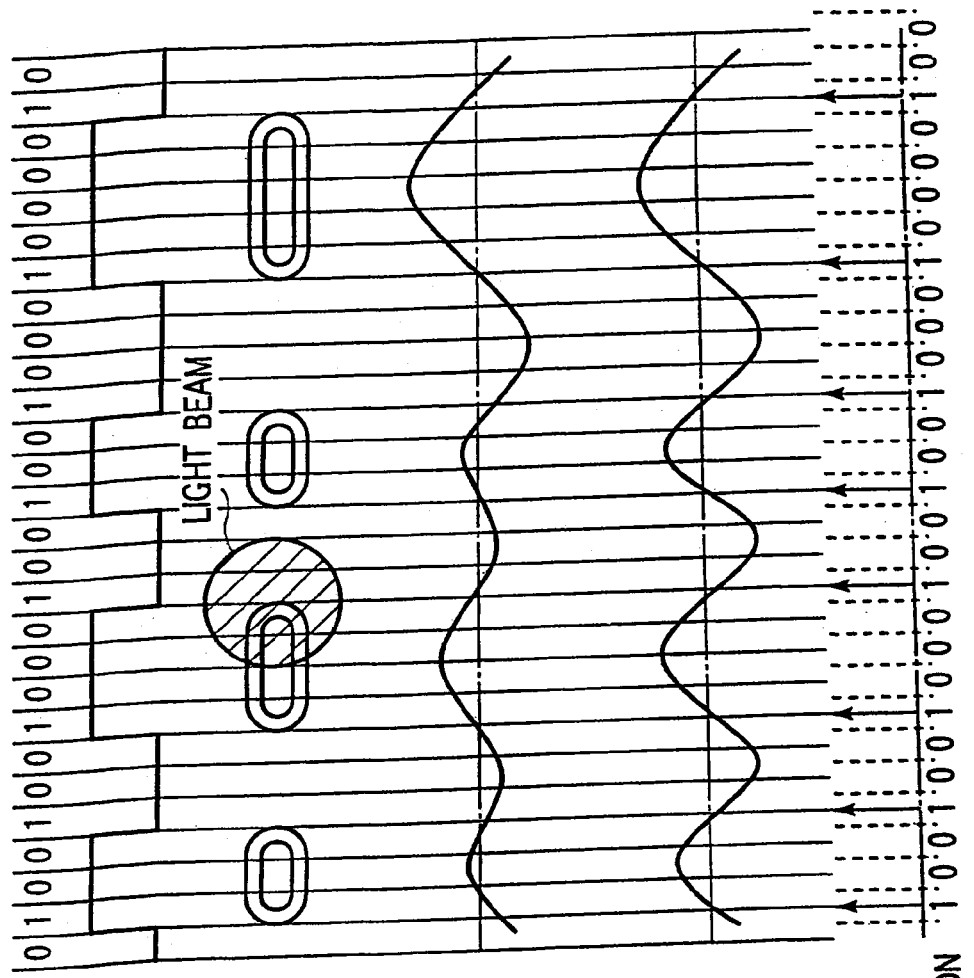
FIGS. 15A to 15F are diagrams showing signal waveforms and data values at main portions of the level slice signal processing circuit.

As shown in FIG. 15C, a pit series is previously recorded on the optical disk 1 according to the recording waveform of NRZI form shown in FIG. 15B and corresponding to recording data which is information to be recorded as shown in FIG. 15A.

When information thus recorded on the optical disk 1 is reproduced, a light beam for reproduction from a photodiode in the optical pickup section 22 is applied to the optical disk 1 as a fine beam spot as indicated by a hatched portion in FIG. 15C to read out the pit series and derive a reproducing signal.

The waveform (reproduced waveform) of the reproduction signal is not obtained as a rectangular wave such as a recording waveform as shown in FIG. 15B because of the characteristic of the recording/reproducing system and is obtained as a dull waveform as shown in FIG. 15D.

Therefore, the reproduced waveform is subjected to waveform equalization in the equalizer 53 so that an intersection point between the equalized waveform and a preset threshold level (indicated by a dashed line) will be set at the center of the window. More specifically, the high frequency component of the reproduction signal is amplified.

As shown in FIG. 15F, the level slice detector 54 detects an intersection point between the equalized waveform and the threshold level, and if the intersection point is detected in the window, it outputs binary data "1", and if the intersection point is not detected in the window, it outputs binary data "0".

Thus, the 8-16 RLL demodulator 56 demodulates the binary data from the level slice detector 54.

As shown in FIG. 14, the PRML signal processing circuit 24 includes an AGC amplifier 61, adder 62, A/D converter 63, equalizer (linear equalizer) 64, ML decoder (Viterbi decoder) 65, 1,7 RLL demodulator 66, PLL circuit 67, AGC controller 68 and offset controller 69.

The AGC amplifier 61 corrects the level of a signal from the signal detector 35 according to a control signal from the AGC controller 68 and outputs the corrected signal to the adder 62. The adder 62 adds the signal from the AGC amplifier 61 with an offset signal from the offset controller 69 and outputs the result of addition to the A/D converter 63. The A/D converter 63 converts the signal from the adder 62 into a digital signal of a discrete time and discrete amplitude series according to a channel clock from the PLL circuit 67 and outputs the digital signal to the equalizer 64.

The equalizer 64 is constructed of a linear equalizer which is formed of an FIR filter (transversal filter), performs an equalizing process for the waveform (reproduced waveform) of the reproduction signal from the A/D converter 63 into a waveform of PR(1,1) characteristic and outputs the equalized waveform to the ML decoder 65, PLL circuit 67, AGC controller 68 and offset controller 69.

The ML decoder 65 is constructed by a Viterbi decoder, decodes the equalized waveform from the equalizer 64, detects the same as binary data and outputs the binary data to the 1,7 RLL demodulator 66.

The 1,7 RLL demodulator 66 demodulates the decoded binary data from the ML decoder 65 based on the 1,7 RLL code.

The PLL circuit 67 generates a channel clock based on the signal from the equalizer 64 and outputs the channel clock to the A/D converter 63. That is, it recovers the channel clock by converting a difference between the amplitude of the PR equalized waveform and an ideal amplitude value into a phase difference.

The AGC controller 68 corrects the signal in the AGC amplifier 61 based on the equalized waveform from the equalizer 64.

The offset controller 69 outputs an offset value to the adder 62 based on the equalized waveform from the equalizer 64.

Next, the signal processing system by the PRML signal processing circuit 24 is explained with reference to the waveform diagrams shown in FIGS. 16A to 16G.

Figure 16:
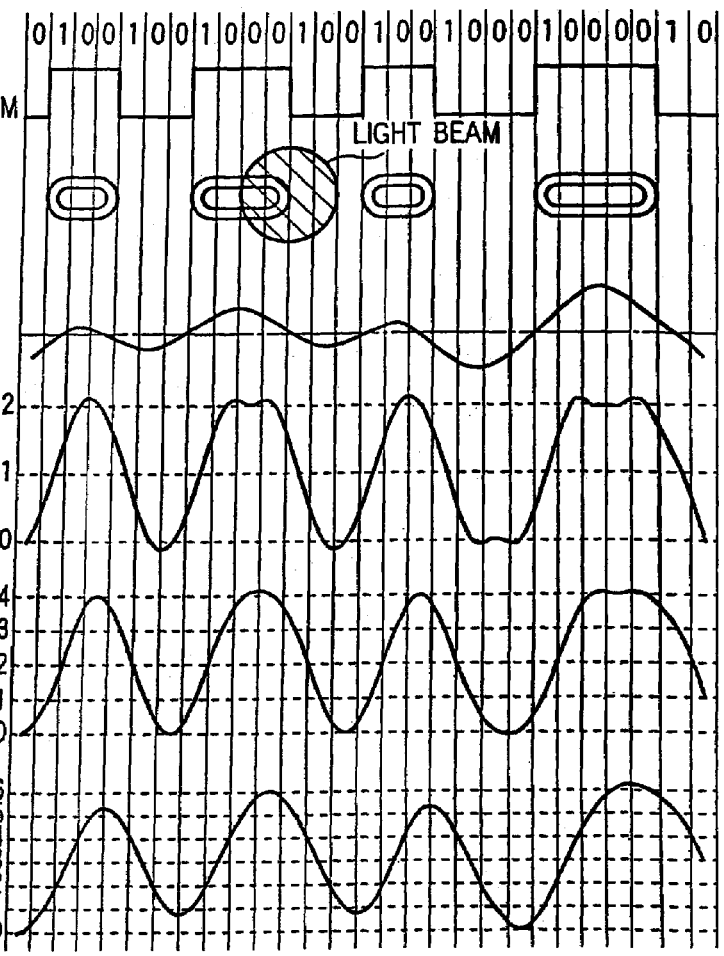
FIGS. 16A to 16G are diagrams showing signal waveforms and data values at main portions of the PRML signal processing circuit.

A pit series is previously recorded on the optical disk 1 as shown in FIG. 16C according to the recording waveform of NRZI form shown in FIG. 16B and corresponding to recording data which is information to be recorded as shown in FIG. 16A.

When information thus recorded on the optical disk 1 is reproduced, a light beam for reproduction from the photodiode in the optical pickup section 22 is applied to the optical disk 1 as a fine beam spot as indicated by a hatched portion in FIG. 16C to read out the pit series and derive a reproducing signal.

The waveform (reproduced waveform) of the reproducing signal is not obtained as a rectangular wave such as a recording waveform as shown in FIG. 16B because of the characteristic of the recording/reproducing system and is obtained as a dull waveform as shown in FIG. 16D.

Waveforms obtained after subjecting the reproduced waveform of FIG. 16D to waveform equalization based on the PR(1,1) characteristic, PR(1,2,1) characteristic and PR(1,2,2,1) characteristic in the equalizer 64 are respectively shown in FIGS. 16E, 16F, 16G. The PR(1,1) characteristic is a characteristic in which an impulse response appears at the rate of 1:1 at two successive identification points (=amplitude values of the reproduced waveform at two channel clock timings).

The recording waveform of NRZI form of FIG. 16B corresponding to the first part "010010" of recording data of FIG. 16A is expressed as follows.

011100

Since the reproduced waveform is regarded as being an impulse response to "1" of the recording waveform, the waveform of FIG. 16E expressed as linear superposition of the following responses and obtained as "012210" becomes a target waveform to be equalized as the PR(1,1) characteristic (class).

0110
00110
000110

The PR(1,2,1) characteristic is a characteristic in which an impulse response appears at the rate of 1:2:1 at three successive identification points. The PR(1,2,2,1) characteristic is a characteristic in which an impulse response appears at the rate of 1:2:2:1 at four successive identification points. As in the case of the PR(1,1) characteristic, to-be-equalized target waveforms derived by linear superposition of impulse responses corresponding to the recording waveform become the waveforms as shown in FIGS. 16F, 16G (although not shown in the drawing, this is also applied to other PR characteristics).

As shown in FIGS. 16E, 16F, 16G, it is understood that the characteristic of the waveform after equalization becomes a duller characteristic in the order of PR(1,1) characteristic→PR(1,2,1) characteristic→PR(1,2,2,1) characteristic.

In the PRML system, an increase in the signal degrading component in the equalizer 64 can be suppressed by equalizing the reproduced waveform into a waveform of a PR characteristic which is closer to the characteristic of the reproduced waveform.

In the reproduction signal processing system of PRML system, a Viterbi decoder which is a representative one of maximum likelihood decoders is generally used as the ML decoder 65 arranged after the equalizer 64.

If the reproduced waveform is equalized into a waveform of the PR(1,2,2,1) characteristic by the equalizer 64, the ML decoder 65 selects a series having the smallest error with respect to the sample series of the equalized waveform from all of the reproduced waveform series which satisfy the PR(1,2,2,1) characteristic and estimates and outputs recording data (binary data, decoded data) used as a source for generating the selected reproduced waveform series while tracing the state transition.

Figure 17:
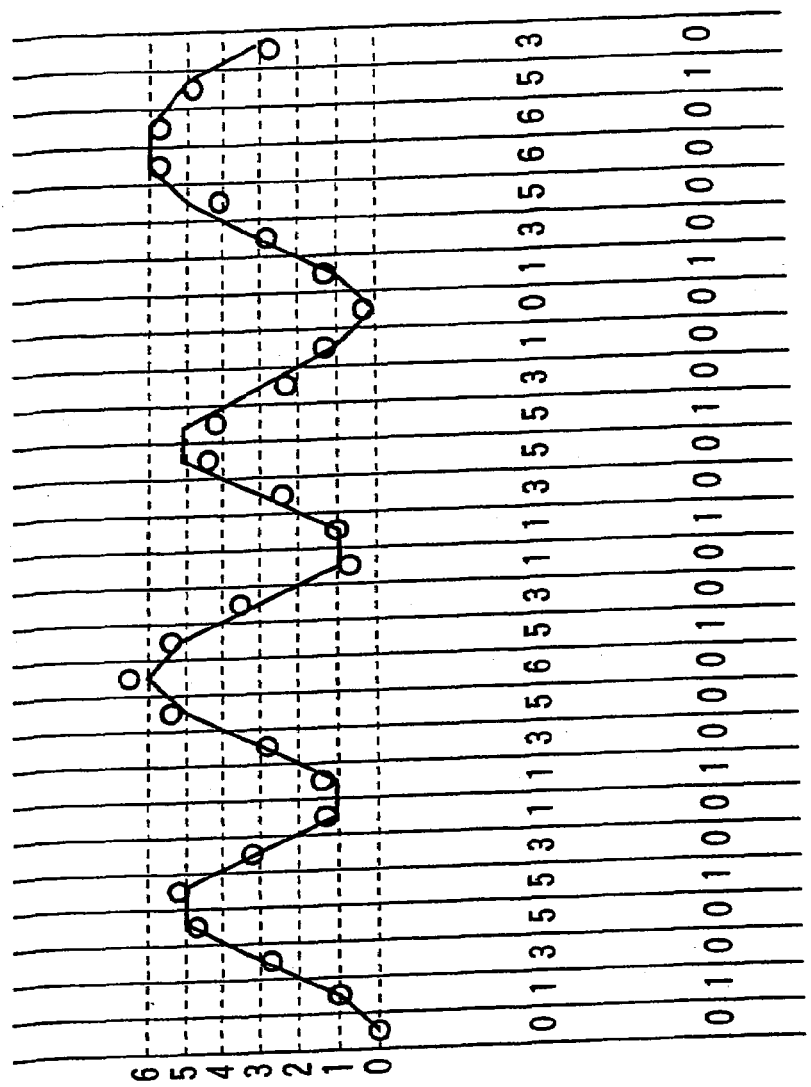
FIGS. 17A to 17C are diagrams for illustrating the decoding process using an ML decoder.

The state is shown in FIGS. 17A to 17C. In the PRML system, since the decoding process is not effected based on one sample value but based on a sequence using the correlation (waveform interference) due to the PR characteristic of a series of a plurality of sample values as a premise, the PRML system is highly resistant to the signal degrading component having no correlation between sample values.

The signal determining circuit 25 determines whether a signal now reproduced is a signal from the header field 3, 8 or a signal from the recording field 11 in which user data is recorded.

As shown in FIG. 13, the signal determining circuit 25 includes a band-pass filter (BPF) 71, comparator (Comp) 72 and re-triggerable multivibrator 73. The re-triggerable multivibrator 73 is supplied with a power supply voltage via a circuit including resistors R1, R2 and capacitor C.

The signal determining circuit 25 receives a signal from the signal detector 35 of the optical pickup section 22 and makes the determination and outputs the result of determination to the drive control circuit 26.

Figure 18:
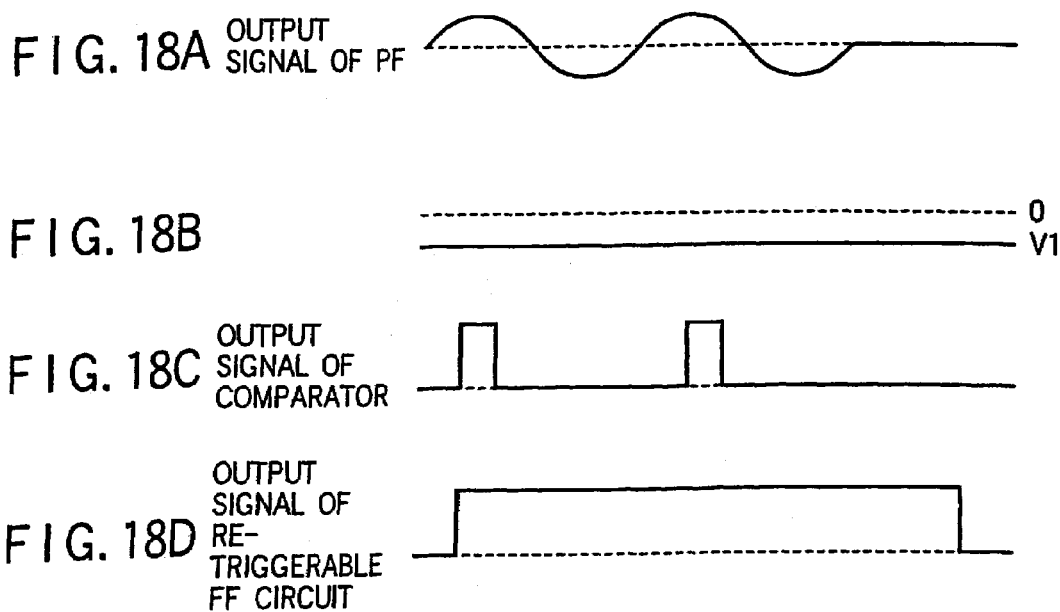
FIGS. 18A to 18D are diagrams showing signal waveforms in the signal determining circuit.

For example, in a case of groove 2 in which data is recorded in the header field 3, 8 by use of pre-pits and the recording field 11 of user data is wobbled, if a signal [(Ia+Ib)−(Ic+Id)] of the photo-detector 40 as shown in FIG. 13 is input to the signal detector 35 shown in FIG. 13, a determination signal corresponding to the recording field 11 for recording user data can be obtained as shown by the waveform of FIG. 18D, and therefore, the drive control circuit 26 determines whether it is the recording field 11 or not based on the determination signal.

As shown in FIG. 18A, that is, the band-pass filter (BPF) 71 outputs a waveform having an amplitude based on the wobbled groove 2 to the comparator (Comp) 72. When the comparator (Comp) 72 is supplied with the waveform of amplitude from the band-pass filter (BPF) 71, it outputs a pulse signal as shown in FIG. 18C to the re-triggerable multivibrator 73 based on a comparison voltage V1 shown in FIG. 18B. The re-triggerable multivibrator 73 outputs a determination signal as shown in FIG. 18D to the drive control circuit 26 based on the pulse signal from the comparator 72.

Thus, a convex portion of the wobble signal shown in FIG. 18A is detected by the comparator 72 and a detection signal shown in FIG. 18C is used as a trigger signal of the re-triggerable multivibrator 73, and an output of the re-triggerable multivibrator 73 is set at "1" as shown in FIG. 18D while the convex portion of the wobble signal is being detected.

The error correcting section 27 is constructed by an ECC decoder, corrects errors in the demodulated data from the 8-16 RLL demodulator 56 of the level slice signal processing circuit 23 and outputs the corrected data to the drive control circuit 26 as data of the header field 3, 8 or corrects an ECC error of demodulated data from the 1,7 RLL demodulator 66 of the PRML signal processing circuit 24 and outputs the corrected data to the host device interface 28 as reproducing data from the recoding field 11.

The host device interface 28 outputs reproduction data from the error correcting section 27 to a host device (not shown), outputs an instruction of recording or reproduction and the access position from the host device to the drive control circuit 26, or converts recording data from the host device into data of a data form having an error correction code added thereto by an ECC encoder (not shown) and outputs the converted data to the modulator 29.

The modulator 29 encodes data supplied from the host device interface 28 into a 1,7 modulation code or data to be recorded on a channel and outputs the coded data to the write compensating circuit 30 used as a recording compensator. The write compensating circuit 30 converts an output waveform from the modulator 29 into an NRZI form and outputs a write current waveform in which a deviation between the write waveform and the mark form caused by conduction of heat of the optical disk 1 is compensated for to the write driver 31.

The drive control circuit 26 controls the whole portion of the optical disk apparatus 21.

The drive control circuit 26 supplies a selection signal to the level slice signal processing circuit 23 or PRML signal processing circuit 24 according to the determination signal from the signal determination circuit 25 and performs the control operation so that data now produced can be adequately processed.

For example, the drive control circuit 26 outputs a selection signal to a changeover switch 59 of the level slice signal processing circuit 23 to turn ON the changeover switch 59 so that demodulated data from the 8-16 RLL demodulator 56 can be output to the error correcting section 27 via the changeover switch 59.

Further, the drive control circuit 26 outputs a selection signal to a changeover switch 70 of the PRML signal processing circuit 24 to turn ON the changeover switch 70 so that demodulated data from the 1,7 RLL demodulator 66 can be output to the error correcting section 27 via the changeover switch 70.

In addition, the drive control circuit 26 controls the servo controller 32 based on address data including data from the error correcting section 27 and instruction data from the host device so as to move the light beam from the optical pickup section 22 to the access position and control the spindle motor 33 to rotate at a rotation speed of a zone corresponding to the access position.

Further, the drive control circuit 26 controls the write driver 31 so as to control a semiconductor laser oscillator (not shown) based on recording data from the write compensating circuit 30 to emit a light beam.

The drive control circuit 26 includes an AM detector 26a, SYNC detector 26b and format controller 26c.

The AM detector 26a detects an address mark AM of the header field 3, 8 according to a demodulation signal from the 8-16 RLL demodulator 56 based on the channel clock from the PLL circuit 55 of the level slice signal processing circuit 23.

For example, the AM detector includes a register in which the pattern of the address mark AM is stored, a register for recording a demodulation signal from the 8-16 RLL demodulator 56 based on the channel clock from the PLL circuit 55 and a comparator for comparing register data items in the two registers and outputs a detection signal of the address mark AM to the format controller 26c when a coincidence signal is output from the comparator.

The SYNC detector 26b detects a SYNC code of the recording field 11 according to a demodulation signal from the 1,7 RLL demodulator 66 based on the channel clock from the PLL circuit 67 of the PRML signal processing circuit 24.

For example, the SYNC detector includes a register in which the pattern of the SYNC code is stored, a register for recording a demodulation signal from the 1,7 RLL demodulator 66 based on the channel clock from the PLL circuit 67 and a comparator for comparing register data items in the two registers and outputs a detection signal of the SYNC code to the format controller 26c when a coincidence signal is output from the comparator.

The format controller 26c determines a position illuminated on the track by the laser light from the optical pickup section 22 and controls timings of the control signals output to the respective sections by using the result of determination as a reference by counting a read clock, write clock or wobble clock while attaining synchronization by use of a detection signal of the address mark AM from the AM detector 26a and a detection signal of the SYNC code from the SYNC detector 26b.

The read clock is a clock at the data reproducing (readout) time, the channel clock from the PLL circuit 55 is supplied to the format controller 26c when data of the header field 3, 8 is reproduced and the channel clock from the PLL circuit 67 is supplied to the format controller 26c when data of the recording field 11 is reproduced.

The write clock is a clock generated based on a clock having a preset cycle from a clock generating section (not shown), that is, a reference clock from an oscillator and supplied to the format controller 26c.

The wobble clock is a clock generated from a clock generating section (not shown) based on an output signal from the signal detector 35 of the optical pickup section 22 and supplied to the format controller 26c.

That is, the format controller 26c determines a position illuminated on the track by the laser light from the optical pickup section 22 and controls timings of the control signals output to the respective sections by using the result of determination as a reference by counting the read clock or wobble clock while attaining synchronization by use of a detection signal of the address mark AM of the header field 3, 8 and a detection signal of the SYNC code of the recording field 11 when data of the recording field 11 is read out.

Further, the format controller 26c determines a position illuminated on the track by the laser light from the optical pickup section 22 and controls timings of the control signals output to the respective sections by using the result of determination as a reference by counting the read clock or wobble clock while attaining synchronization by use of a detection signal of the address mark AM of the header field 3, 8 when data of the recording field 11 is written and by counting the write clock or wobble clock in the recording field 11.

With the construction shown in FIGS. 13, 14, since data of the header field 3, 8 is constructed by pre-pits, the write data modulator 29 is only required to cope with a (1,7) RLL code used in the PRML system of the recording field 11.

The signal processing system on the reproducing side is constructed by two systems including a system for processing the header field 3, 8 according to the level slice system and a system for processing the recording field 11 for recording user data according to the PRML signal processing system, but in the above embodiment, since an 8-16 modulation code in which the minimum run length is 3 is used as the modulation code of the header field 3, 8, it becomes necessary to provide the demodulator 56 for the 8-16 RLL modulation code in the succeeding stage of the signal processing system of the level slice system. Further, since a (1,7) modulation code in which the minimum run length is 1 is used as the modulation code of the recording field 11 for recording user data, it becomes necessary to provide the demodulator 66 for the (1,7) RLL modulation code in the succeeding stage of the signal processing system of the PRML system.

Figure 19:
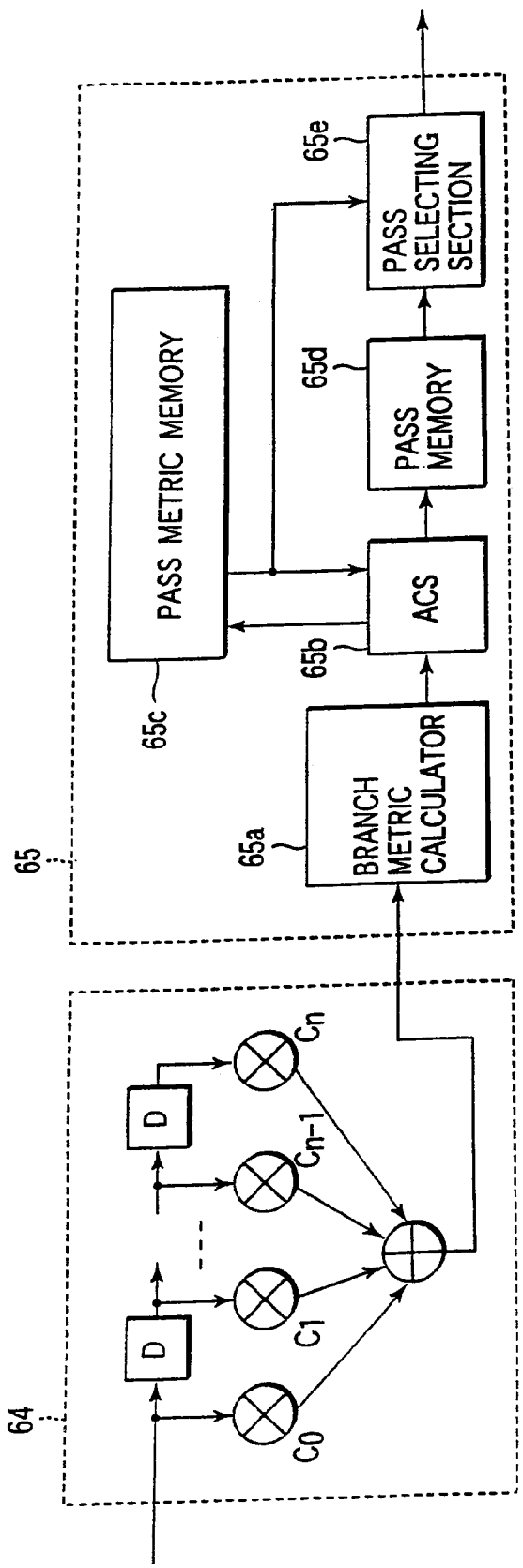
FIG. 19 is a diagram showing the schematic construction of an equalizer and ML decoder.

FIG. 19 is a diagram showing the construction of the linear equalizer (PR equalizer) 64 and ML decoder (Viterbi decoder, ML detector) 65 which are the main portions of the PRML signal processing circuit 24.

The ML decoder 65 selects a series having the smallest error with respect to the sample series of the equalized waveform and outputs binary data (decoded data) corresponding to the selected series.

That is, as shown in FIGS. 17A to 17C, in a case where the signal waveform series obtained after PR(1,2,2,1) equalization is given as follows,

01355311356531 . . .

impulse responses for a candidate of recorded data (01010 . . . ) (the recorded waveform is 01100 . . . ) are given as follows.

012210 . . .
001221 . . .

Then, the reproduced waveform of an ideal PR characteristic obtained by linear superposition of the above impulse responses is obtained as follows.

013431 . . .

Further, impulse responses for a candidate of another recorded data (01110 . . . ) (the recorded waveform is 01110 . . . ) are given as follows.

0122100 . . .
0012210 . . .
0001221 . . .

Then, the reproduced waveform of the ideal PR characteristic obtained by linear superposition of the above impulse responses is obtained as follows.

0135531 . . .

After this, the cross-correlations with respect to the waveform series of the above reproduced waveforms are calculated and a series having the highest correlation (=the smallest error between the series) with respect to the reproduced equalized waveform is selected by a probabilistic method.

The number of candidates of the waveform can be increased and counted up as in a tree structure but the number of available states is limited when taking the PR characteristic into consideration. In the case of the PR(1,2, 2,1) characteristic, the constraint length (the range which the waveform interference gives an influence) is "4" and variations of recording data series caused by the waveform interference occur in 16 combinations of four-digit values constructed by two types of data values of "0" and "1", and therefore, the state number having no redundancy is 16 at maximum. There is a possibility that the state number will be reduced if the modulation code is limited.

The ML decoder 65 calculates the probability according to an input sample value when it is assumed that the state is transited from a certain state to a next state. When a plurality of candidates of the waveform series transited to the same state are provided, a probable one of the candidates is determined based on the accumulated value of the past transition probability.

For this purpose, a pass memory 65d for storing candidates of the waveform series is provided in the ML decoder 65. Generally, the length thereof is set to a length of several ten channel bits. A plurality of candidates of the waveform series are transited to the same state while they pass through the pass memory 65d, then the candidates are repeatedly selected and the most probable series is finally selected.

A branch metric calculating section 65a calculates a logarithm value of the probability of transition of the state which is expressed in terms of a difference between actual amplitude and ideal amplitude obtained if it is assumed that the state is transited from a certain state to a next candidate state when a sample value is input. A pass metric memory 65c is a memory for storing a past branch metric accumulated value obtained until the state transition for each of the states of the state number is repeatedly effected and the state is attained.

Figure 20:
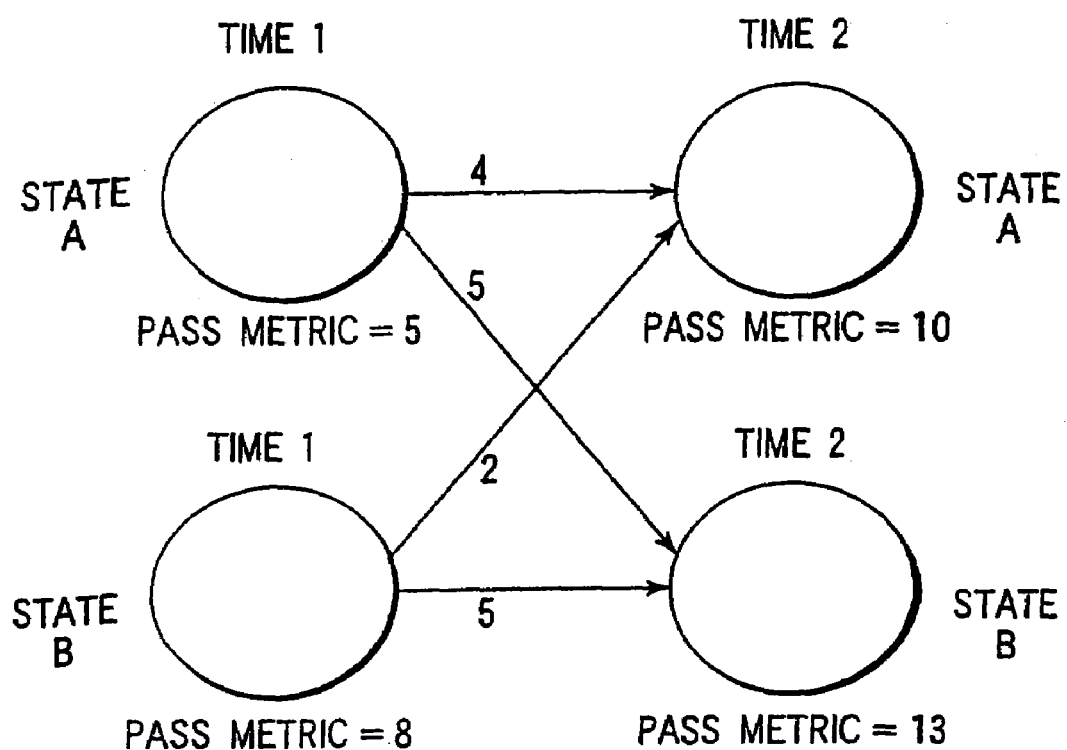
FIG. 20 is a diagram for illustrating a change in the state of ACS.

An ACS 65b is the abbreviated name of a circuit for performing the Add (addition), Compare (comparing) and Selection (selecting) operations. As shown in FIG. 20, it is assumed that the pass metric values of the states A and B at time 1 are respectively set at "5" and "1", the branch metric caused for transition from the state A (at time 1) to the state A at time 2 is "4", the branch metric caused for transition from the state A (at time 1) to the state B is "5", the branch metric caused for transition from the state B (at time 1) to the state A is "2", and the branch metric caused for transition from the state B (at time 1) to the state B is "5".

In the ACS 65b, a value "9" obtained by adding the pass metric value "5" of the state A at time 1 with the branch metric "4" caused for transition from the state A (at time 1) to the state A (at time 2) and a value "10" obtained by adding the pass metric value "8" of the state B at time 1 with the branch metric "2" caused for transition from the state B (at time 1) to the state A (at time 2) are compared with each other and transition from the state B (at time 1) to the state B (at time 2) corresponding to the larger value is selected (in practice, since the metric value is diverged if a larger value is selected, a circuit for making a calculation in which the metric value corresponding to a higher probability takes a smaller value by properly dealing with the equations and selecting a smaller metric value is mounted in many cases). Likewise, a value "10" obtained by adding the pass metric value "5" of the state A at time 1 with the branch metric "5" caused for transition from the state A (at time 1) to the state B (at time 2) and a value "13" obtained by adding the pass metric value "8" of the state B at time 1 with the branch metric "5" caused for transition from the state B (at time 1) to the state B (at time 2) are compared with each other and transition from the state B (at time 1) to the state B (at time 2) corresponding to the larger value is selected. In this case, since it is only the state B of time 1 that has been transited to each of the states of time 2, the waveform series which is set to the state A at time 1 is eliminated from the candidate to be selected. The pass memory 65d is a memory for recording series (=pass) remaining as selected candidates. Generally, only one candidate of the series is left behind by the time the candidate passes through the pass memory 65d, but a plurality of series may remain as candidates depending on the noise condition, and in this case, the series which is determined as the most probable candidate is selected by comparing the contents of the pass memory 65d and the pass metric of the pass metric memory 65c by use of the pass selecting section 65e.

Since the series is selected and detection data is determined after the series has passed through the pass memory 65d, an output of the ML decoder 65 is more delayed than in a case of the conventional data detector of a waveform slice system.

In the above embodiment, data of the header field 3, 8 is detected by the level slice system having less detection delay and data of the recording field 11 for recording user data is detected by the PRML system capable of attaining the high recording density. In the case of the PRML system, a system such as the 1,7 modulation code in which the code rate can be made high and the channel band can be suppressed to a low level is used.

The 1,7 modulation code is a conversion system for conversion to a code in which the code rate is 2/3, the minimum run length (=d constraint) indicating the minimum number of "0s" lying between "1" and "1" of the data series is "1", and the maximum run length (=k constraint) indicating the maximum number of "0s" lying between "1" and "1" of the data series is "7".

As the modulation code adequately applied to the PRML system and having the code rate of 2/3 (2 to 3, conversion of 2-bit data to 3 bits), an 8-12 modulation code having the d constraint of 1 is provided in addition to the 1,7 modulation code.

On the other hand, in the case of the level slice system, a system such as a 2,7 modulation code in which the code rate is low, but the minimum run length can be set large is preferable. The 2,7 modulation code is a conversion system for conversion to a code in which the code rate is 1/2, the minimum run length (=d constraint) indicating the minimum number of "0s" lying between "1" and "1" of the data series is "2", and the maximum run length (=k constraint) indicating the maximum number of "0s" lying between "1" and "1" of the data series is "7". As the modulation code adequately applied to the level slice system and having the minimum run length (=d constraint) of "2", an 8-16 modulation code having the code rate of 8/16 and an 8-15 modulation code having the code rate of 8/15 are provided in addition to the 2,7 modulation code.

The reason why the system in which the minimum run length can be set to a large value can be adequately used for the level slice system is that it is important that the linear convolution is established even when the minimum mark/pit amplitude value is small in the case of PRML system, but it is impossible to slice the amplitude if the minimum mark/pit amplitude value is not larger than a certain value in the case of level slice system.

The 1,7 modulation code is a modulation code in which the code rate is 2/3, the d constraint is "1" and the k constraint is "7". As shown in FIG. 21A, the d constraint of "1" indicates that the constraint is set so as to provide at lest one "0" between "1" and "1" of the code after modulation. The k constraint of "7" indicates that the constraint is set so as to provide seven "0s" at most between "1" and "1" of the code after modulation. Since the modulated code is recorded in the NRZI form (FIG. 21B) when it is recorded on the optical disk 1, the minimum pit/mark length is set to the length of two channel clocks period and the maximum pit/mark length is set to the length of eight channel clocks period.

The 8-16 modulation code used in the DVD is a modulation code in which the code rate is 1/2, the d constraint is "2" and the k constraint is "10". Therefore, when the code is recorded on the recording medium, the minimum pit/mark length is set to the length of three channel clocks period and the maximum pit/mark length is set to the length of eleven channel clocks period. Like the 8-16 modulation code, in the 8-15 modulation code, the d constraint is "2" and the minimum pit/mark length is set to the length of three channel clocks period.

If the same user data recording density is set for the 1,7 modulation code and 8-16 modulation code, 2-bit user data is converted into a 3-bit code in the 1,7 modulation code and 2-bit user data is converted into a 4-bit code in the 8-16 modulation code, and therefore, the length of one channel clock in the 8-16 modulation code becomes ¾ times that of the 1,7 modulation code. However, since the minimum pit/mark length of the 8-16 modulation code is set to the length of three channel clocks period and the minimum pit/mark length of the 1,7 modulation code is set to the length of two channel clocks period, the result of (¾×3/2=9/8) is obtained. Thus, it is understood that the 8-16 modulation code has a slightly larger bit length and is more suitably used for the level slice system. Therefore, in order to use the level slice system having less detection delay for the header field 3, 8, it is required to make the recording density in the linear direction of information recorded in the header field 3, 8 lower than the recording density in the linear direction of information recorded in the user data recording field 11.

In the above example, a case wherein the 8-16 modulation code is used for the header field 3, 8 and the 1,7 modulation code is used for the user data recording field 11 is explained as a code selection example based on the reality, but the same modulation code can be used for the header field 3, 8 and the user data recording field 11 in certain cases. Also, in this case, since it is impossible to operate the level slice system at the same amplitude value as the PRML system with the recording density at which the PRML system can be used for the user data recording field 11, it becomes necessary to lower the recording density in the linear direction of the header field 3, 8 and elongate the pit/mark length to attain a large amplitude value.

As an example of a method for using the same modulation code for the header field 3, 8 and user data recording field 11 and lowering the recording density in the linear direction of the header field 3, 8 to elongate the pit length or mark length and attain a large amplitude value, a method for writing data in which a code of the minimum pit length does not appear into the header field 3, 8 is provided.

The advantage of this method is that the channel clock rate becomes the same in the header field 3, 8 and user data recording field 11 although the physical pit recording density is lowered. Therefore, it becomes unnecessary to separate the PLL for clock recovery for the header field 3, 8 and the PLL for clock recovery for the user data recording field 11. Further, since the modulation code is the same, the demodulator can be commonly used.

In a recording/reproducing optical disk apparatus using a pre-pit header for the header field 3, 8, there is a large difference between the level of a signal from the mark of the user data recording field 11 and the level of a signal from the pit of the header field 3, 8. Since the PRML signal processing system is a system for detecting an amplitude value at an identification point synchronized with the channel clock, it tends to be influenced by a level variation. Of course, a correction for level difference between the header field 3, 8 and the user data recording field 11 is made by use of an AGC, but it is difficult to completely eliminate the influence by the previously used level at the changeover time if the detection system utilizes the same PRML signal processing system.

Since it is necessary to make the GAP field for changeover large in order to almost completely eliminate the influence, the format efficiency is lowered. If the conventional level slice system is applied to the ID section of the recording/reproduction optical disk apparatus using the pre-pit header, it is expected that the above problem can be solved.

As shown in FIGS. 22A to 22C, data is recorded in the header field 3, 8 by use of a modulation code having the minimum pit (mark) length of three channel bits and, as shown in FIGS. 22D to 22F, data is recorded in the recording field 11 by use of a modulation code having the minimum pit (mark) length of two channel bits.

That is, FIGS. 22A to 22C show the relation between the channel bit pattern (FIG. 22A), write current waveform (FIG. 22B) and to-be-written pit (mark) (FIG. 22C) in the case of the minimum pit in the (1,7) modulation code.

FIGS. 22D to 22F show the relation between the channel bit pattern (FIG. 22D), write current waveform (FIG. 22E) and to-be-written pit (mark) (FIG. 22F) in the case of the minimum pit in the 8-16 modulation code.

In a modulation code such as the 8-16 modulation code shown in FIGS. 22D to 22F in which the code rate is low, the clock frequency becomes high and the width of the data detection window becomes narrow even if the minimum pit/mark length is large.

As for the conversion ratio in the case of 8-16 modulation, one-bit user data is converted into a 2-bit channel bit pattern from the viewpoint of ratio, and in the case of (1,7) modulation in which the code rate is higher, 2-bit user data is converted into a 3-bit channel bit pattern.

Therefore, as indicated by the relationship shown in FIGS. 22A to 22C and FIGS. 22D to 22F, even if the minimum pit (mark) length is larger in the 8-16 modulation and the amplitude can be made larger than in the (1,7) modulation accordingly, the window width is shorter in the 8-16 modulation than in the (1,7) modulation and it becomes more difficult to control the rise and fall positions of the waveform.

If the recording density is enhanced, it is advantageous to use the mark edge form in which information can be recorded on both edges in a condition that the recording density is restricted by the minimum pit/mark length, but if an attempt is made to attain a sufficiently large margin by lowering the recording density, it is expected that the reliability can be enhanced by using a mark position form in which information is recorded only in the mark position and simplifying the construction of the data recording and reproducing means.

That is, pre-pits are formed in the header field 3, 8 by the recording method of the mark position form and recording marks are written into the user data recording field 11 by the recording method of the mark edge form.

As shown in FIG. 2, in the case of the groove recording system, the groove is interrupted (temporarily terminated) in a portion of the pre-pit header of the header field 3 in some cases.

Further, as shown in FIG. 4, in the case of the groove/land recording system, the groove is interrupted in a portion of the pre-pit header of the header field 8 in some cases.

That is, in the case of a wobble groove system for wobbling the groove in the radial direction, timing is generated by use of a clock synchronized with wobbling. Therefore, if a deviation occurs with respect to the phase of the clock before the wobble groove is interrupted and after the wobble groove is re-started, the PLL pull-in process becomes necessary and stability cannot be maintained.

Therefore, even when the recording density and minimum pit/mark length are changed for the header field 3, 8 and the recording field 11, the length of the to-be-interrupted groove of the header field 3, 8 is set to the integral multiple of the groove cycle. Alternatively, the phase of the amplitude at timing when the wobble groove is re-started after the header field 3, 8 is set to a value which can be derived based on the phase at the end time of the wobble groove and the interruption time length by the header field 3, 8.

That is, an output of a phase difference detection circuit (not shown) of the PLL circuits 55, 67 synchronized with the wobble signal before interruption of the wobble groove is set to have such a phase that a large phase difference will not be detected when the wobble signal is input after interruption.

If the recording density is lowered (coarse) to make the pit/mark length large, a sufficiently large amplitude value can be surely obtained, but in the case of level slice system, the detection window width is important as well as the amplitude value.

In a DVD, the pit/mark recording system on the optical disk 1 is a mark edge form in which information is recorded in rise and fall positions of the waveform. As shown in FIG. 22B, in the modulation code such as the 8-16 modulation code in which the code rate is low, the clock frequency becomes high and the data detecting window width becomes narrow even if the minimum pit/mark length is large. That is, it is difficult to control the rise and fall positions of the waveform. If the recording density is enhanced (dense), it is advantageous to use the mark edge form in which information can be recorded on both ends in a condition that the recording density is restricted by the minimum pit/mark length. However, if an attempt is made to attain a sufficiently large margin by lowering the recording density, it is expected that the reliability can be enhanced by using a mark position form in which information is recorded only in the mark position and simplifying the construction of the data recording and reproducing means.

That is, as shown in FIGS. 2, 4, pre-pits are formed in the header field 3, 8 by the recording method of the mark position form and recording marks are written into the user data recording field 11 by the recording method of the mark edge form.

Next, with the above construction, the data recording process and data reproduction process in the optical disk apparatus 21 are explained with reference to the flowchart shown in FIG. 23.

Immediately after the seeking operation of the optical pickup section 22 is completed or, when the format controller 26c deviates from the tracing path by a disturbance or the like, that is, when the format controller 26c cannot grasp the position on the track, the following control process is effected.

That is, the signal determining circuit 25 checks the signal level of a signal supplied from the optical pickup section 22 (ST1) and determines whether or not it is the recording field 11 for recording user data (ST2).

As the result of determination, if the signal determining circuit 25 determines that it is the user data recording field 11, the circuit 25 outputs a signal indicating the user data recording field 11 to the drive control circuit 26 (ST3).

Then, the drive control circuit 26 outputs a selection signal to the PRML signal processing circuit 24 (ST4).

In step ST2, if the signal determining circuit 25 does not determine the user data recording field 11, it outputs a signal indicating the header field 3, 8 to the drive control circuit 26 (ST5).

Then, the drive control circuit 26 outputs a selection signal to the level slice signal processing circuit 23 (ST6).

While the PRML signal processing circuit 24 or level slice signal processing circuit 23 is being selected by the selection signal obtained in step ST4 or ST6, the drive control circuit 26 establishes synchronization of the format controller 26c and records data or reproduces recorded data based on data from the signal processing system properly selected for each field (ST7).

At the start of correct data reproduction, the format controller 26c can grasp the position on the track and the determination result of the signal determining circuit 25 is used no more.

Figure 24:
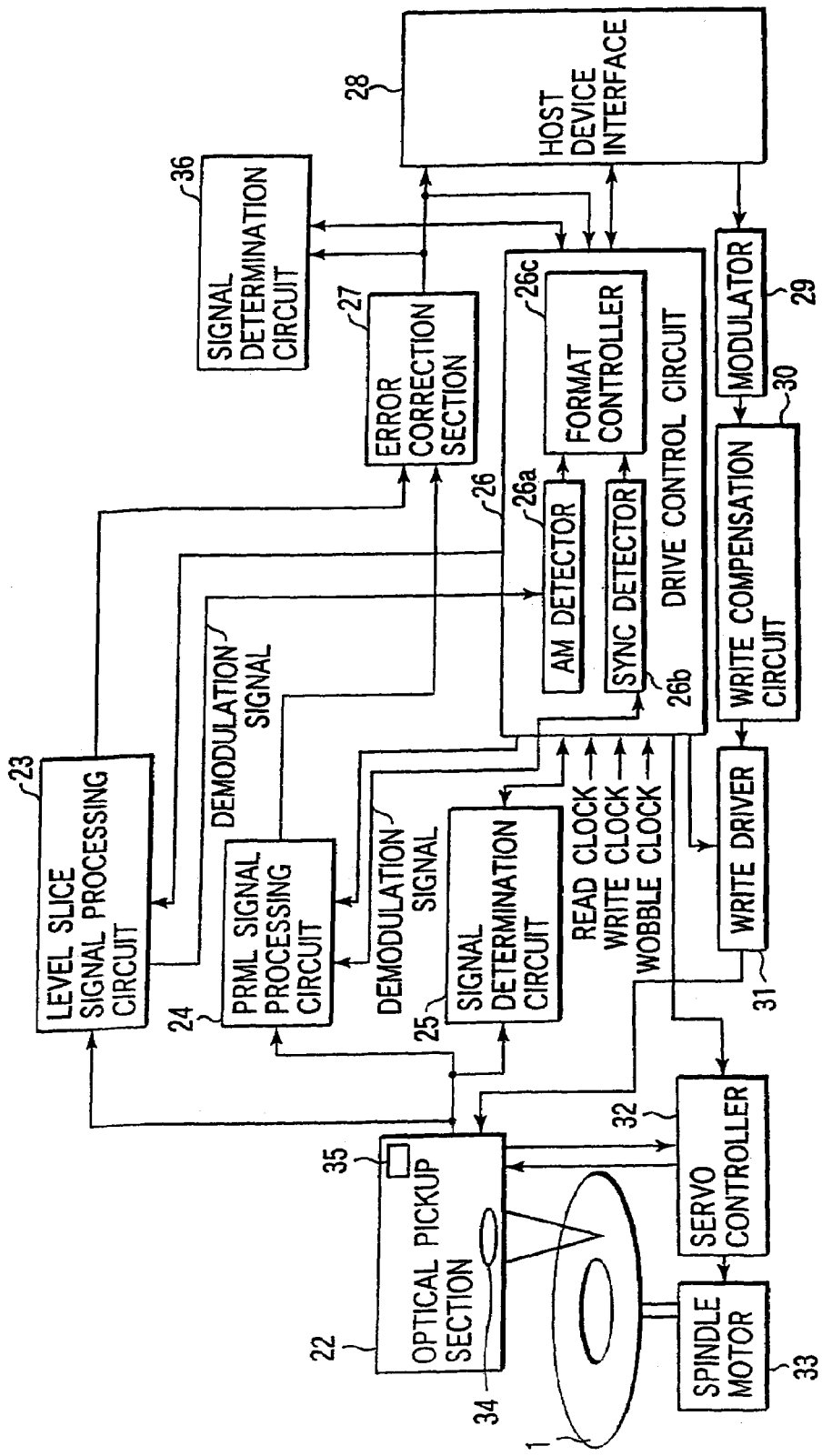
FIG. 24 is a diagram showing the schematic construction of an optical disk apparatus according to another embodiment.

In the above embodiment, a case wherein the signal determining circuit 25 is provided in the succeeding stage of the optical pickup section 22 is explained, but this is not limitative and, as shown in FIG. 24, a case wherein a signal determining circuit 36 is provided in the succeeding stage of the error correcting section 27 can be realized in the same manner. Portions which are the same as those of FIG. 12 are denoted by the same reference numerals and an explanation thereof is omitted.

In the signal determining circuit 36, whether the signal now reproduced is a signal from the header field 3, 8 or a signal from the user data recording field 11 is determined based on whether data is significant or not. In order to determine whether the signal now reproduced is a signal from the header field 3, 8 or a signal from the user data recording field 11, an attempt is made to read out data on the assumption that one of the fields is temporarily determined in the initial condition. When a signal is determined to be output from the temporarily determined field, significant data such as the sync code portion VFO, address mark AM can be obtained and the position in the temporarily determined field is detected at this time point.

In the case of a rewriting type, since no data is written in the user data recording field 11 in some cases, it is preferable to search for significant data on the assumption that the header field 3, 8 is temporarily determined.

In this case, the signal determining circuit 36 determines whether data can be read out from the header field 3, 8 based on an output from the error correcting section 27 which is based on an output of the level slice signal processing circuit 23 for processing the signal from the optical pickup section 22 and determines that the field is the header field 3, 8 when data of the header field 3, 8 can be read out.

Figure 25:
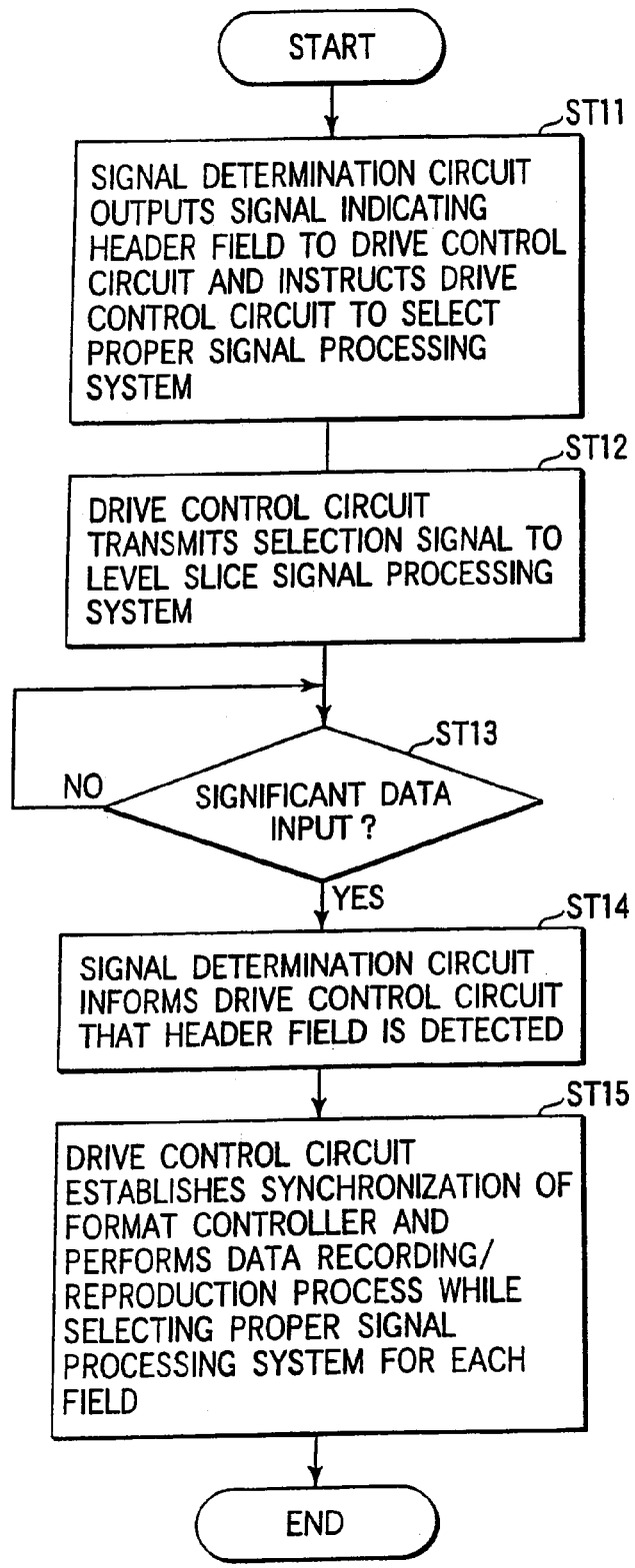
FIG. 25 is a flowchart for illustrating the data recording process and data reproduction process.

With the above construction, the data recording process and data reproduction process in the optical disk apparatus 21 are explained with reference to the flowchart shown in FIG. 25.

Immediately after the seeking operation by the optical pickup section 22 or when the format controller 26c deviates from the tracing path by a disturbance or the like, that is, when the format controller 26c cannot grasp the position on the track, the following control process is effected.

That is, the signal determining circuit 36 outputs a signal indicating the header field 3, 8 to the drive control circuit 26 (ST11).

Then, the drive control circuit 26 outputs a selection signal to the level slice signal processing circuit 23 (ST12).

Thus, a signal from the level slice signal processing circuit 23 is supplied to the signal determining circuit 36 via the error correcting circuit 27.

As a result, the signal determining circuit 36 determines whether significant data such as the sync. code portion VFO, address mark AM can be obtained or not (ST13).

Then, the signal determining circuit 36 outputs a signal indicating the header field 3, 8 to the drive control circuit 26 when significant data is obtained (ST14).

Then, the drive control circuit 26 sets up synchronization of the format controller 26c and records data or reproduces recorded data based on data from the signal processing circuit properly selected for each field (ST15).

At the start of correct data reproduction, the format controller 26c can grasp the position on the track and the determination result of the signal determining circuit 25 is used no more.

Next, another embodiment is explained with reference to FIGS. 26, 27. In this case, portions which are the same as those of FIGS. 12, 14 are denoted by the same reference numerals and an explanation thereof is omitted.

In this embodiment, one example of the construction of the optical disk apparatus 21 is shown in a case where the recording density of the header field 3, 8 in the linear direction is lowered (coarse) and the pit/mark length is made large to make an amplitude value large by using the same modulation code for the header field 3, 8 and user data recording field 11 and writing data having no code with the minimum pit length into the header field 3, 8.

The signal processing system on the reproducing side is constructed by two systems including a system (level slice signal processing circuit 23') for processing the header field 3, 8 according to the level slice system to detect channel data and a system (PRML signal processing circuit 24') for processing the user data recording field 11 according to the PRML signal processing system to detect channel data.

Figure 27:
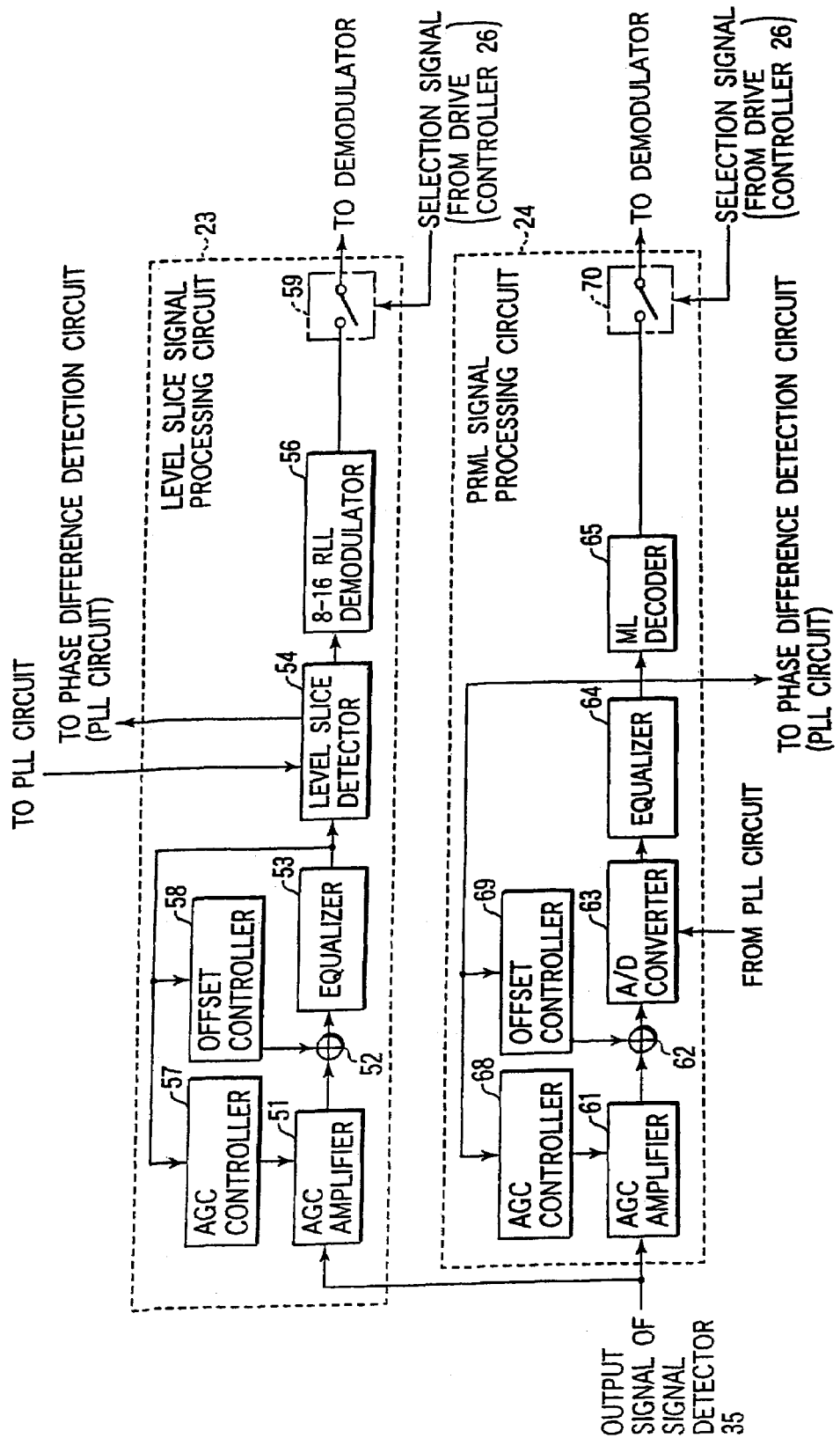
FIG. 27 is a block diagram showing the schematic construction of a level slice signal processing circuit and PRML signal processing circuit.

In the case of FIG. 27, the level slice signal processing circuit 23' is constructed by removing the PLL circuit 55 and 8-16 RLL demodulator 56 from the level slice signal processing circuit 23 shown in FIG. 14 and the PRML signal processing circuit 24' is constructed by removing the PLL circuit 67 and 1,7 RLL demodulator 66 from the PRML signal processing circuit 24 shown in FIG. 14.

Figure 26:
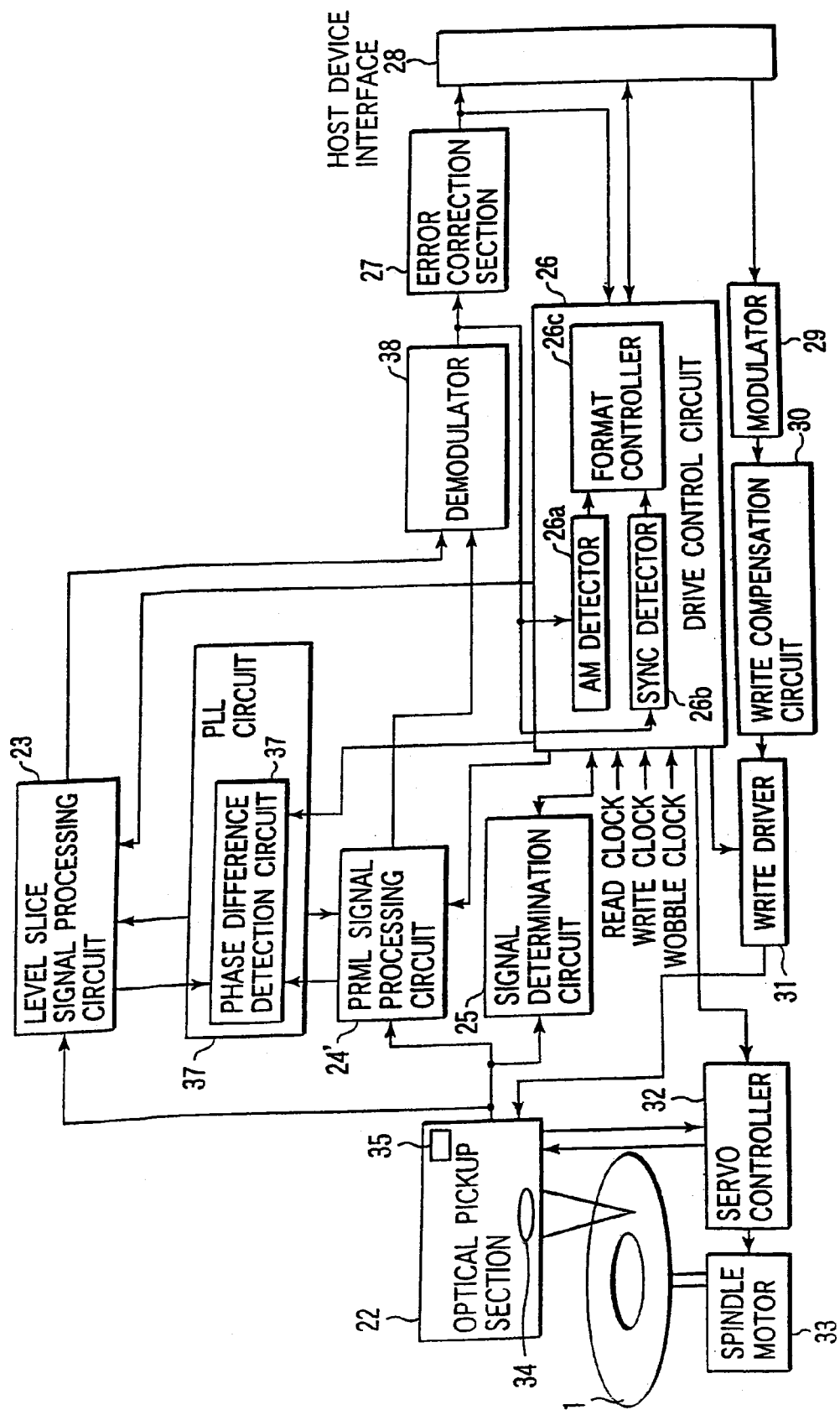
FIG. 26 is a diagram showing the schematic construction of an optical disk apparatus according to another embodiment.

In the case of FIG. 26, a PLL circuit 37 and demodulator 38 which are commonly used by the level slice signal processing circuit 23' and PRML signal processing circuit 24' are provided.

Further, the drive control circuit 26 supplies a selection signal to the level slice signal processing circuit 23' or PRML signal processing circuit 24' according to a determination signal from the signal determining circuit 25 to perform the control operation so that data now reproduced can be properly processed.

At this time, the drive control circuit 26 supplies a changeover signal for a phase difference detecting system to a phase difference detecting circuit 37a in the PLL circuit 37 according to a determination signal from the signal determining circuit 25 to perform the control operation so that data now reproduced can be properly processed. Thus, the phase difference detecting circuit 37a in the PLL circuit 37 generates a clock for reproduction while a phase difference is detected by a phase difference detecting system (detection of a phase difference by the level slice system or detection of a phase difference by the PRML system) suitably selected for the level slice signal processing circuit 23' or PRML signal processing circuit 24'.

As a result, after channel data is detected, the data is demodulated by the common demodulator 38.

Figure 28:
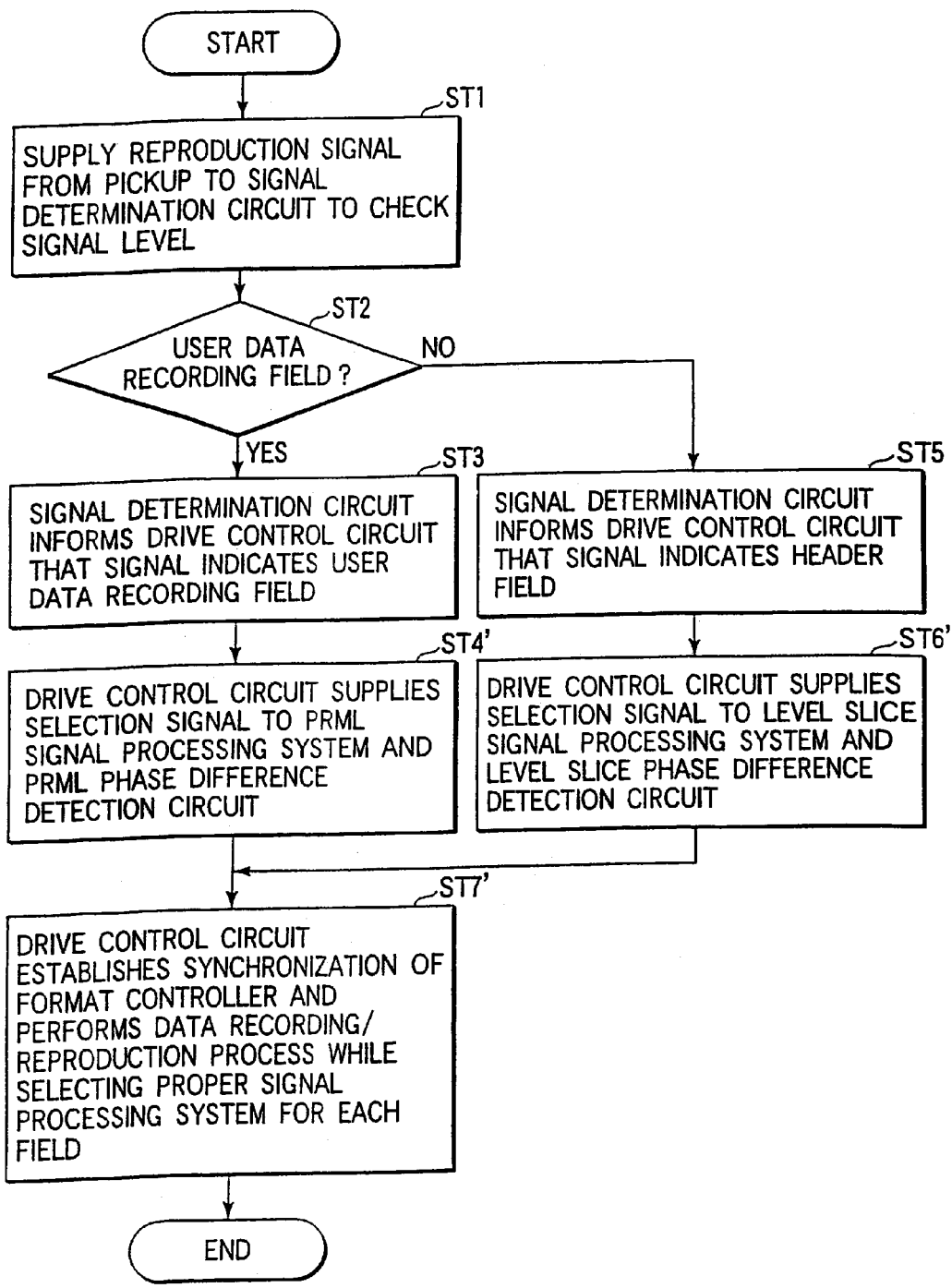
FIG. 28 is a flowchart for illustrating the data recording process and data reproducing process.

Next, with the above construction, the data recording process and data reproduction process in the optical disk apparatus 21 are explained with reference to the flowchart shown in FIG. 28.

Immediately after the seeking operation of the optical pickup section 22 or when the format controller 26c deviates from the tracing path by a disturbance or the like, that is, when the format controller 26c cannot grasp the position on the track, the following control process is effected.

That is, the signal determining circuit 25 checks the signal level of a signal supplied from the optical pickup section 22 (ST1) and determines whether or not it is the recording field 11 for recording user data (ST2).

As a result of determination, if the signal determining circuit 25 determines that it is the user data recording field 11, the circuit 25 outputs a signal indicating the user data recording field 11 to the drive control circuit 26 (ST3).

Then, the drive control circuit 26 outputs a selection signal to the PRML signal processing circuit 24' and phase difference detecting circuit 37a (ST4').

In step ST2, if the signal determining circuit 25 does not determine the user data recording field 11, it outputs a signal indicating the header field 3, 8 to the drive control circuit 26 (ST5).

Then, the drive control circuit 26 outputs a selection signal to the level slice signal processing circuit 23 and phase difference detecting circuit 37a (ST6').

While the PRML signal processing circuit 24 or level slice signal processing circuit 23 is being selected by the selection signal obtained in step ST4' or ST6', the drive control circuit 26 sets up synchronization of the format controller 26c and records data or reproduces recorded data based on data from the signal processing system properly selected for each field (ST7).

When data starts to be correctly reproduced, the format controller 26c can grasp the position on the track and the determination result of the signal determining circuit 25 is used no more.

Next, another embodiment is explained with reference to FIG. 29. In the above embodiment, the header field 3, 8 is constructed by four header fields and only one address mark AM is provided before the address portion PID in each of the header fields, but this is not limitative and, in another embodiment, a plurality of address marks AM can be provided in one header field.

The layout of a header field 71 is shown in FIG. 29. In the format of the header field 3, 8, four header fields are provided, but in this example, it is assumed that only one header field 71 is provided for simplicity, but this does not limit the number of header fields 71.

The header field 71 has a significant feature in that AM (address mark) patterns for detecting divisions between data items are recorded in a plurality of portions of the same header field 71.

The header field 71 is constructed of 49 bytes and includes a 36-byte sync code portion VFO (Variable Frequency Oscillator), 3-byte address mark AM, 4-byte address portion PID (Position Identifier), 2-byte error detection code IED (ID Error Detection Code), one-byte post amble PA and 3-byte address mark AM arranged in this order from the left side.

With the above construction, the reliability at the time of reproduction of information recorded in the header field 71 can be significantly enhanced. That is, as shown in FIG. 29, in this embodiment, the address marks AM for attaining data byte synchronization are respectively provided before the address portion PID and after the post amble PA.

Generally, synchronization is attained by use of the address mark AM provided before the address portion PID to take out succeeding individual information items and, if no error is detected by the error detection code, it is supposed that correct sector information and sector number can be obtained.

In this embodiment, even if an error is detected by use of the error detection code, correct sector information and sector number can be obtained by use of the following means in a case where the detection error is caused only by use of the address mark AM provided before the address portion PID. Since the address mark AM provided before the address portion PID is placed in position immediately after the sync code portion VFO, a detection error tends to occur when the pull-in process of the PLL is delayed by a disturbance. However, even in such a case, data after the address portion PID is correctly read out in some cases.

Next, an ID detecting circuit 80 for detecting the address portion PID in a case where one header field 71 has two address marks AM is explained with reference to FIGS. 30, 31.

Figure 30:
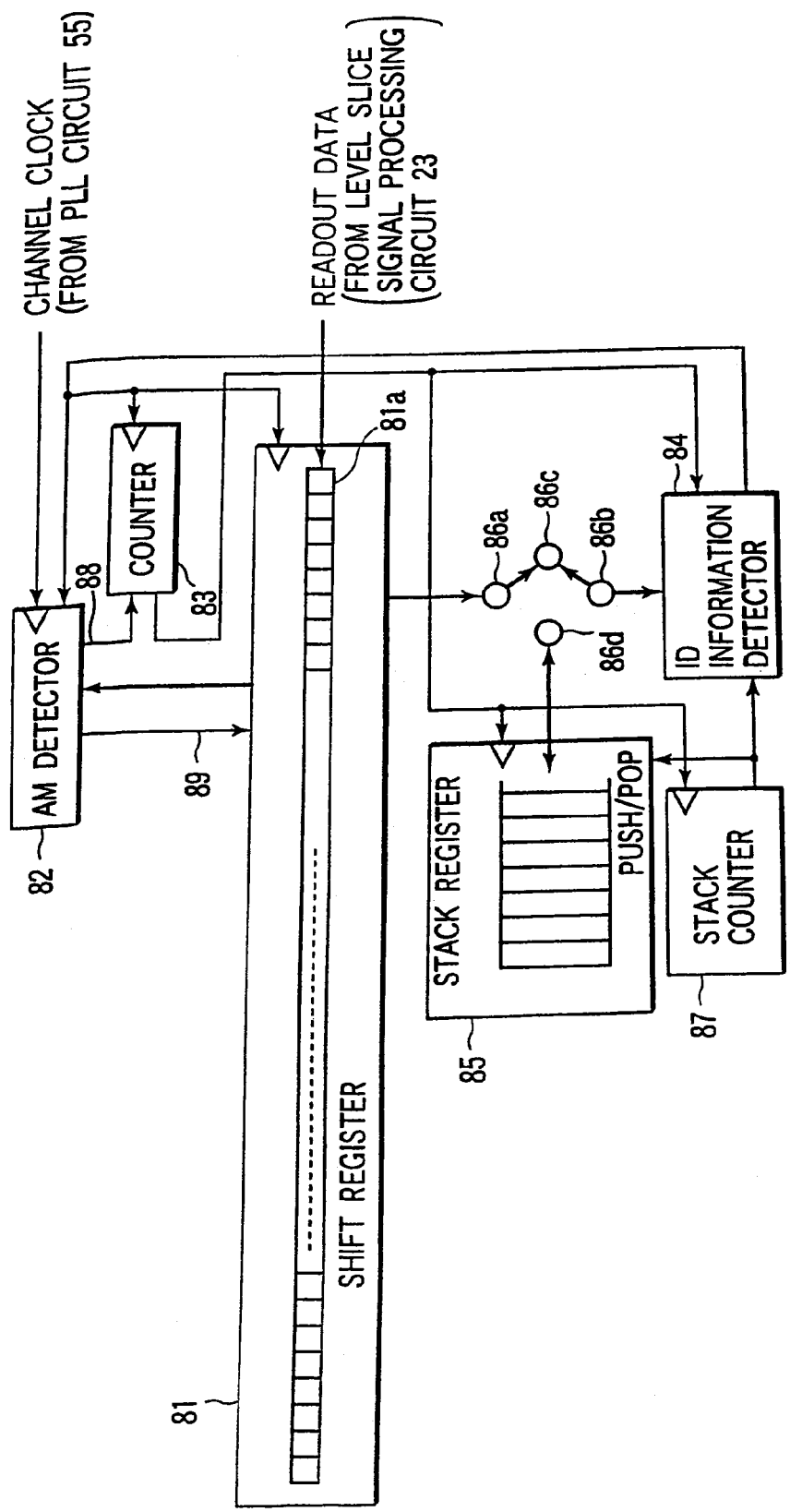
FIG. 30 is a diagram showing the circuit construction of an ID detecting section.

FIG. 30 shows the circuit construction of the ID detecting circuit 80 and FIG. 31 is a circuit construction diagram of the optical disk apparatus 21 having the ID detecting circuit 80 mounted thereon. In the case of FIG. 31, portions which are the same as those of FIGS. 12, 14 are denoted by the same reference numerals and an explanation thereof is omitted. However, it should be noted that the changeover switches 59 in the signal determining circuit 25 and level slice signal processing circuit 23 and the changeover switch 70 in the PRML signal processing circuit 24 are omitted.

As shown in FIG. 31, the ID detecting circuit 80 is provided in the succeeding stage of the 8-16 RLL demodulator 56 which is the last stage of the level slice signal processing circuit 23 for processing the signal from the header field, detects ID information based on binary data decoded by the 8-16 RLL demodulator 56 and the channel clock from the PLL circuit 55 and outputs the detected ID information to the drive control circuit 26.

As shown in FIG. 30, the ID detecting circuit 80 includes a shift register 81, address mark detector (AM detector) 82, counter 83, ID information detector 84, stack register 85, changeover switches 86a, 86b and stack counter 87.

The shift register 81 is supplied with channel bit data as binary data decoded by the 8-16 RLL demodulator 56 at an input terminal 81a and shifts the channel bit data for each bit to the left direction in the drawing in synchronism with the channel clock. The shift register 81 is required to have at least the length capable of receiving all of the data of the header field 71 and is required to have a margin so as to save data for recovery when the first address mark AM fails to be detected and store the whole data even if the data is shifted due to the occurrence of an error. For example, the shift register has a margin of several bytes to several tens of bytes in addition to the data number of 49 bytes of the header field 71.

The AM detector 82 detects an address mark AM based on the coincidence between AM patterns.

The counter 83 notifies that one-byte data is taken out and supplied to the ID information detector 84 for every 16 bits.

The ID information detector 84 recovers sector information and sector number from the readout channel bit pattern and detects an error.

Further, the ID information detector 84 outputs an instruction to the AM detector 82 again to detect the address mark AM when the error detection code IED reading operation is ended so as to make ready for a case wherein an error occurs.

The stack register 85 stacks a lower 16-bit channel data pattern of the shift register 81 supplied via the switch 86a.

The changeover switches 86a, 86b are set on a node 86d side when the top of the stacked data becomes the head address of the address portion PID and puts the contents of the stack register 85 into the ID information detector 84.

The stack counter 87 counts the bytes (=16 channel bits) after the shift register starts to reverse the shifting direction and detects the depth of the stacked data until the top of the stacked data becomes the head address of the address portion PID.

With the above construction, the detection process of the ID detecting circuit 80 is explained with reference to the flowchart shown in FIG. 33.

A signal for starting detection of the address mark AM is supplied from the format controller 26c to the AM detector 82 approximately at a time point when the header field is subjected to the read process and the PLL operation starts to be converged according to the VFO pattern. At the same time, data of the ID field starts to be input to the input terminal 81a of the shift register 81 (ST21). Thus, readout channel bit data is input to the shift register 81 via the input terminal 81a and shifted for each bit to the left direction in FIG. 33 in synchronism with the channel clock.

In this case, it is assumed that data has been subjected to 8-16 modulation in the header field 3, 8, for example. Since the address mark AM is 3 bytes, it is 48 bits in the channel code.

When coincidence of the 48-bit pattern is detected in the AM detector 82, the AM pattern is detected (ST22) and an enable signal is output to the counter 83 via a signal line 88. As a result, the counter 83 is set into the enable state and starts to count the channel clock. Since one-byte data corresponds to a 16-bit code on the channel, the counter 83 informs the ID information detector 84 that one-byte data is taken out for every 16 bits.

At this time, the changeover switches 86a, 86b are set on the node 86c side to permit lower 16-bit data of the shift register 81 to be input as it is to the ID information detector 84 (ST23).

The ID information detector 84 recovers the sector information and sector number from the readout channel bit pattern and detects an error (ST24). If no error is detected, a process for starting access to the sector or a process for making preparation for detection of the next sector is performed by the same operation as in the conventional case (ST25).

When detecting the address mark AM provided after the post amble PA, the AM detector 82 resets the counter 83 by use of a signal supplied via the signal line 88, and at the same time, reverses the shifting direction of the shift register 81 by use of the signal from the signal line 89. The counter 83 re-starts to count the channel clock and supplies a latch signal to the stack register 85 for every 16 bits.

As a result, the lower 16-bit channel data pattern of the shift register 81 is pushed into the stack register 85 via the switch 86a. When the shifting direction of the shift register 81 starts to be reversed, the switch 86a is set on the node 86d side to permit lower 16-bit data of the shift register 81 to be supplied to the stack register 85.

The stack counter 87 counts bytes (=16 channel bits) after the shifting direction of the shift register 81 starts to be reversed and detects the depth of the stacked data until the top of the stacked data becomes the head address of the address portion PID. When the top of the stacked data becomes the head address of the address portion PID, the switches 86a, 86b are set on the node 86d side so as to put the contents of the stack register 85 into the ID information detector 84 (ST27).

The ID information detector 84 recovers sector information and sector number from the readout channel bit pattern and detects an error (ST28).

If no error is detected, a process for starting access to the sector or a process for making preparation for detection of the next sector is performed by use of the above information by the same operation as in the conventional case.

Since the operation after the shifting direction of the sift register 81 is reversed is a retrial operation using the address mark AM provided in the rear portion when an error occurs in the first ID detection process, the operation can be stopped at any point in time if the first ID detection process is successfully effected.

In this embodiment, the other address mark AM is provided after the error detection code IED. Therefore, the ID information detector 84 outputs an instruction to the AM detector 82 again to detect the address mark AM when the error detection code IED reading operation is ended so as to make ready for a case wherein an error occurs. As shown in the steps ST31 to ST33 of FIG. 33, it is possible to detect the other address mark AM before the error detection result is determined by taking the detection time of the error detection code IED into consideration.

In the above embodiment, the address marks AM are distributed and arranged in two portions of the same header field, but this is not limitative and the same operation can be attained even if address marks AM are distributed and arranged in three or more portions of the same header field.

Next, another embodiment in which the contents of the header field are changed depending on the sector is explained. Generally, when the recording density in the header field is lowered, the header field is made longer if the amount of ID information is not reduced, but in this embodiment, an increase in the length of the header field is suppressed by reducing an amount of ID information in the header field for each sector.

As one example, one ECC block is constructed by 16 2-kilobyte sectors in the optical disk 1 used for a DVD as shown in FIG. 8, but in this case, ID information (refer to FIG. 29) identical to that in the conventional case is recorded in the header field 3, 8 of the head sector of the ECC block and only the sector number or track number is recorded in the header field 3, 8 of the other sectors.

As another example, if ID information is constructed by four bytes as shown in FIG. 34, the amount of ID information is reduced by recording the least significant one byte in the header field of each sector and distributing and recording the remaining three bytes in the respective sectors.

A more specific example is shown in FIG. 35. A header field of the conventional form in which ID information is constructed by four bytes of ID information 1 to ID information 4, the contents of the ID information 1 is "00010100", the contents of the ID information 2 is "11001001", the contents of the ID information 3 is "00111101" and the contents of the ID information 4 is "01100001" is considered and an example of ID information of a form based on this embodiment and corresponding to the above form is shown.

It is supposed that three successive sectors each having a header field to which the ID information of this embodiment is applied are provided. In the header field of the first sector, only the ID information 1 and ID information 4 of the header of the conventional form are recorded. That is, the contents of binary data recorded in the header field become "00010100"+"01100001". Only binary data obtained by incrementing the contents of the ID information 4 by one and the ID information 2 of the header of the conventional form are recorded in the header of the second sector.

That is, the contents of the binary data recorded in the header field become "11001001"+"01100010". The reason why the contents of the second byte become a value obtained by incrementing the contents of the ID information 4 of the header field of the conventional form by one is that the ID information 4 is supposed to be the least significant byte of the sector number and the sector number is incremented by one. Only binary data obtained by incrementing the contents of the ID information 4 by two and the ID information 3 of the header of the conventional form are recorded in the header of the third sector. That is, the contents of binary data recorded in the header field become "00111101"+"101100011".

In this embodiment, since the whole portion of the ID information cannot be obtained simply by reading one header field, it takes a long time to obtain a correct sector number (block number), for example. However, in a conventional ID information recording method, when access is made to a large number of successive header fields, the amount of information in a redundant portion and readout time of the header field become useless since most of the ID information is not so different in the adjacent header fields.

In this embodiment, information which varies for each header field is recorded in each header field and information of a portion which does not change is distributed in a plurality of header fields so as to enhance the efficiency of the readout time and information amount.

As still another example, a system for supporting additional writing and rewriting of written data is considered as a recording/reproducing optical disk. That is, the system is a system in which new data can be additionally written in a portion immediately after a data field in which significant data is written, data cannot be jumped to and written into a field successive to a data field in which data has not been written and the contents of a data field in which data has been already written can be rewritten. Since data exists in the lead-in field of the optical disk to which access is first made, initial writing can be performed immediately after this field.

In the optical disk system with the above construction, address information can be eliminated from the header field. Since ID information is recorded together with user data in the sector or ECC block in which data is already written, the access position can be detected by reading out the above data. It is only required to record a pattern used for synchronization of the start position of the sector (block) in the header field.

As described above, a signal of the conventional level slice system can be detected and detection delay time can be reduced by setting the recording density of the header field in the linear direction lower (coarse) than that of the user data recording field.

Further, a signal of the conventional level slice system can be detected and detection delay time can be reduced by using the mark position form having a large detection margin as the information recording system of the header field.

Further, a readout error of the sector number due to a detection error can be compensated for by recording the address marks AM for attaining byte synchronization of the header field in both of the head portion and tail portion of information recorded in the header field.

Thus, it becomes possible to provide an optical disk which has a large capacity and is high in reliability and in which the length of the to-be-changed field is reduced to improve the format efficiency by suppressing the readout delay of the sector number of the header field and a readout error of the sector number due to a detection error of the data dividing pattern in the header field can be compensated for.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording method for recording information on a recording medium, the recording medium having a first area including first data formed as pre-pit data; and a second recording area being configured to store second recording data, a minimum mark length of the second recording data being based on a 2T system, the second recording data being recorded in such a manner as to be detected in partial response and maximum likelihood (PRML) detecting system, wherein the first data is adapted to be measured by a first circuit including a slicer, the second recording data is adapted to be detected by a second circuit which differs from the first circuit, the second circuit includes the PRML detecting system, and the first data and the second recording data are formed according to a NRZI manner, the information recording method comprising:

creating the second recording data.

2. An information reproducing method for reading information from a recording medium, the recording medium having a first area including first data formed as pre-pit data; and a second recording area being configured to store second recording data, a minimum mark length of the second recording data being based on a 2T system, the second recording data being recorded in such a manner as to be detected in partial response and maximum likelihood (PRML) detecting system, wherein the first data is adapted to be measured by a first circuit including a slicer, the second recording data is adapted to be detected by a second circuit which differs from the first circuit, the second circuit includes the PRML detecting system, and the first data and the second recording data are formed according to a NRZI manner, the information reproducing method comprising:

reading the first data and the second recording data from said recording medium; and detecting the second recording data by the PRML detecting system.

3. An information reproducing apparatus for reading information from a recording medium, the recording medium having a first area including first data formed as pre-pit data; and a second recording area being configured to store second recording data, a minimum mark length of the second recording data being based on a 2T system, the second recording data being recorded in such a manner as to be detected in partial response and maximum likelihood (PRML) detecting system, wherein the first data is adapted to be measured by a first circuit including a slicer, the second recording data is adapted to be detected by a second circuit which differs from the first circuit, the second circuit includes the PRML system, and the first data and the second recording data are formed according to a NRZI manner, the information reproducing apparatus comprising:

a reading unit which reads the first data and the second recording data from said recording medium; and a detecting unit which detects the second recording data by the PRML detecting system.

* * * * *